(12) United States Patent
Shi et al.

(10) Patent No.: US 11,139,922 B2
(45) Date of Patent: Oct. 5, 2021

(54) METHOD TO MANAGE DOWNLINK DATA DELIVERY STATUS

(71) Applicant: TELEFONAKTIEBOLAGET LM ERICSSON (PUBL), Stockholm (SE)

(72) Inventors: Nianshan Shi, Järfälla (SE); Alexander Vesely, Feldbach (AT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/634,224

(22) PCT Filed: Sep. 26, 2018

(86) PCT No.: PCT/IB2018/057462
§ 371 (c)(1),
(2) Date: Jan. 27, 2020

(87) PCT Pub. No.: WO2019/064202
PCT Pub. Date: Apr. 4, 2019

(65) Prior Publication Data
US 2020/0228245 A1 Jul. 16, 2020

Related U.S. Application Data

(60) Provisional application No. 62/563,852, filed on Sep. 27, 2017.

(51) Int. Cl.
H04L 1/16 (2006.01)
H04L 1/18 (2006.01)
H04W 80/08 (2009.01)

(52) U.S. Cl.
CPC .......... H04L 1/1635 (2013.01); H04L 1/1671 (2013.01); H04L 1/1835 (2013.01); H04L 1/1874 (2013.01); H04W 80/08 (2013.01)

(58) Field of Classification Search
CPC ... H04L 1/1635; H04L 1/1671; H04L 1/1835; H04L 1/1874; H04L 1/1896; H04W 40/12; H04W 40/125; H04W 84/042
USPC ........................................ 370/329, 331, 412
See application file for complete search history.

(56) References Cited

U.S. PATENT DOCUMENTS 9,386,594 B2    7/2016  Liu et al.
2017/0135023 A1*  5/2017  Jung ..................... H04W 40/12
2020/0359356 A1* 11/2020  Sirotkin ................ H04L 1/1896

OTHER PUBLICATIONS

Nokia Networks et al, "Introduction of dual connectivity and Flow Control", 3GPP TSG-RAN WG3 Meeting #85, Dresden, Germany, Aug. 18-22, 2014, 8 pages, R3-141671, 3GPP.

* cited by examiner

Primary Examiner — Harun Chowdhury

(57) ABSTRACT

The generation and use of a modified DDDS, suitable for RLC AM and RLC UM, is disclosed herein. The modified DDDS optionally includes an IE specifying a highest sequence number of a packet successfully delivered to a wireless terminal. Node B, which is in wireless communication with a wireless terminal, sends the modified DDDS to Node A, where Node A sends DL data packets to Node B for transmission to the wireless terminal responsive to the received modified DDDS.

18 Claims, 16 Drawing Sheets

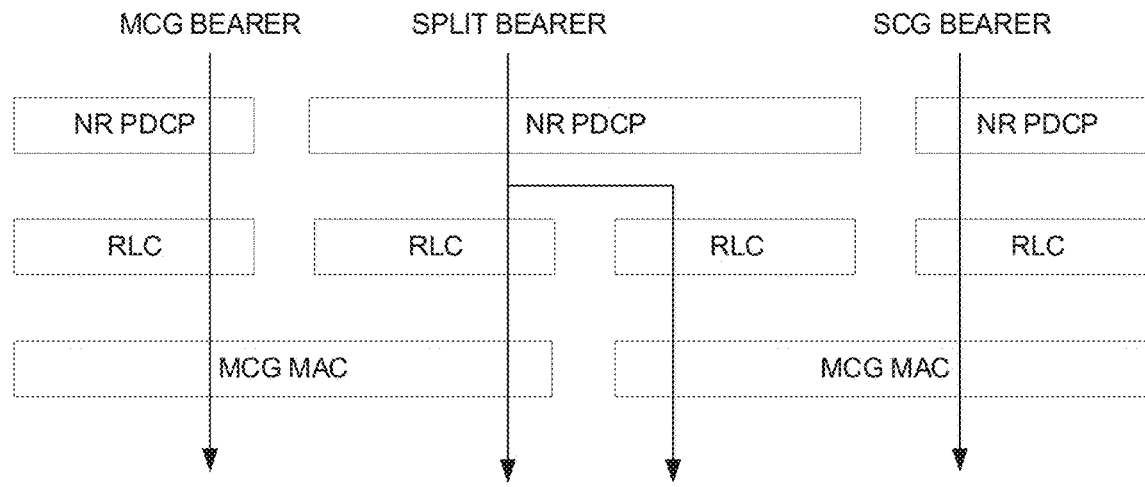

Figure 6

| BITS | | | | | | | | NUMBER OF OCTETS |
|---|---|---|---|---|---|---|---|---|
| 7 | 6 | 5 | 4 | 3 | 2 | 1 | 0 | |
| PDU TYPE (=1) | | | | SPARE | HIGHEST DELIVERED PDCP SN IND | FINAL FRAME IND. | LOST PACKET REPORT | 1 |
| HIGHEST SUCCESSFULLY DELIVERED PDCP SEQUENCE NUMBER | | | | | | | | 3 |
| DESIRED BUFFER SIZE FOR THE DATA BUFFER | | | | | | | | 4 |
| MINIMUM DESIRED BUFFER SIZE FOR THE UE | | | | | | | | 4 |
| NUMBER OF LOST Xn-U SEQUENCE NUBMER RANGES REPORTED | | | | | | | | 1 |
| START OF LOST Xn-U SEQUENCE NUMBER RANGE | | | | | | | | 6* (NUMBER OF REPORTED LOST Xn-U SN RANGES) |
| END OF LOST Xn-U SEQUENCE NUMBER RANGE | | | | | | | | |
| SPARE EXTENSION | | | | | | | | 1-7 |

Figure 7A

| BITS | | | | | | | | NUMBER OF OCTETS |
|---|---|---|---|---|---|---|---|---|
| 7 | 6 | 5 | 4 | 3 | 2 | 1 | 0 | |
| PDU TYPE (=1) | | | SPARE | | HIGHEST DELIVERED PDCP SN RELEVANT | FINAL FRAME IND. | LOST PACKET REPORT | 1 |
| HIGHEST SUCCESSFULLY DELIVERED PDCP SEQUENCE NUMBER | | | | | | | | 3 |
| DESIRED BUFFER SIZE FOR THE DATA BUFFER | | | | | | | | 4 |
| MINIMUM DESIRED BUFFER SIZE FOR THE UE | | | | | | | | 4 |
| NUMBER OF LOST Xn-U SEQUENCE NUBMER RANGES REPORTED | | | | | | | | 1 |
| START OF LOST Xn-U SEQUENCE NUMBER RANGE | | | | | | | | 6* (NUMBER OF REPORTED LOST Xn-U SN RANGES |
| END OF LOST Xn-U SEQUENCE NUMBER RANGE | | | | | | | | |
| SPARE EXTENSION | | | | | | | | 1-7 |

Figure 7B

| BITS | | | | | | | | NUMBER OF OCTETS |
|---|---|---|---|---|---|---|---|---|
| 7 | 6 | 5 | 4 | 3 | 2 | 1 | 0 | |
| PDU TYPE (=1) | | | | SPARE | HIGHEST PDCP TRANSMITTED IND | FINAL FRAME IND. | LOST PACKET REPORT | 1 |
| HIGHEST SUCCESSFULLY DELIVERED PDCP SEQUENCE NUMBER | | | | | | | | 3 |
| DESIRED BUFFER SIZE FOR THE DATA BUFFER | | | | | | | | 4 |
| MINIMUM DESIRED BUFFER SIZE FOR THE UE | | | | | | | | 4 |
| NUMBER OF LOST Xn-U SEQUENCE NUBMER RANGES REPORTED | | | | | | | | 1 |
| START OF LOST Xn-U SEQUENCE NUMBER RANGE | | | | | | | | 6* (NUMBER OF REPORTED LOST Xn-U SN RANGES) |
| END OF LOST Xn-U SEQUENCE NUMBER RANGE | | | | | | | | |
| SPARE EXTENSION | | | | | | | | 1-7 |

Figure 7C ns
METHOD TO MANAGE DOWNLINK DATA DELIVERY STATUS

RELATED APPLICATIONS

This application is a 371 of International Application No. PCT/IB2018/057462, filed Sep. 26, 2018, which claims priority to U.S. Provisional Application Ser. No. 62/563,852, filed Sep. 27, 2017, the disclosures of which are incorporated in their entirety by reference.

TECHNICAL FIELD

The solution presented herein generally relates to controlling the delivery of downlink data packets, and more particularly relates to the Downlink Data Delivery Status (DDDS) used to implement such control.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Dual connectivity is a 3rd Generation Partnership Project (3GPP) Release 12 feature where radio resources from two eNBs are aggregated, and a User Equipment (UE) is connected to the two eNBs simultaneously. To assist the user plan data distribution, Downlink Data Delivery Status (DDDS) was introduced to provide feedback to allow the node hosting Packet Data Convergence Protocol (PDCP) entity to control the downlink user data flow.

When 3GPP Release 15 introduces 5G/New Radio (NR), the dual connectivity then is expected to expand to cover dual connectivity between a Long Term Evolution (LTE) node and an NR node, or between two NR nodes. See, e.g., FIG. 6, which shows an example of Dual Connectivity in NR.

With the introduction of splitting the Next Generation Radio Access Network (NG-RAN) node into a Central Unit (CU) and a Distributed Unit (DU), a user plane protocol is also introduced in the 5G NG-RAN node. Consequently, the DDDS is included in the following user plane protocols: X2 interface user plane protocol (X2UP), Xn interface user plane protocol (XnUP), and F1 interface user plane protocol (F1UP).

The conventional DDDS includes the following three mandatory information elements (IEs):
the highest PDCP Protocol Data Unit (PDU) sequence number (SN) successfully delivered in sequence to the UE among those PDCP PDUs received from the NG-RAN node (e.g., gNB) hosting the PDCP entity;
the desired buffer size in bytes for the concerned data bearer; and
the minimum desired buffer size in bytes for the UE.

The desired buffer size is defined as "information of the currently desired buffer size at the Secondary eNB (SeNB) for transmitting to the UE user data associated with a specific E-RAB (E-UTRAN (Universal Terrestrial Radio Access Network) Radio Access Bearer) configured with the split bearer option."

This restricts the use of the DDDS and makes it impossible in the cases when we want to better utilize the message.

There currently exist certain challenges. As indicated above, one of the mandatory presented information elements in LTE DDDS is "the highest PDCP PDU sequence number successfully delivered in sequence to the UE." First, this implies that the DDDS is meant only for the Radio Link Control Acknowledged Mode (RLC AM), where the system could feedback the PDCP PDUs successfully delivered and acknowledged by the UE. Second, this implies that the DDDS sending frequency is determined by the RLC Acked rate, which is the rate/frequency at which the RLC layer sends the Acknowledgement. It is beneficial to be able to use the DDDS for RLC Unacknowledged Mode (UM) user data flow control.

Another drawback is that it is not possible to send the DDDS before the first RLC sends an ACK message. Sending the DDDS in advance may be beneficial for the assisting node (e.g., SeNB or S-NG-RAN node) to inform the node hosting the PDCP entity (e.g., MeNB or M-NG-RAN node) the desired buffer size so that the node hosting the PDCP entity could distribute the data packages accordingly.

Lastly it is not possible to use DDDS for the purpose of only providing the information of the desired buffer size and the minimum desired buffer size during the data transmission, without repeating the "the highest PDCP PDU sequence number successfully delivered," when it is unchanged.

SUMMARY

Certain aspects of the present disclosure and their embodiments may provide solutions to these or other challenges. According to certain embodiments, a solution to solve the above-mentioned problems is to enhance the current DDDS. These enhancements could include, without limitation, one or more of the following:
Only include "the highest PDCP PDU sequence number successfully delivered in sequence to the UE among those PDCP PDUs received from the gNB hosting the PDCP entity" when it applies, e.g., making this information element as optionally present;
Extend the desired buffer size to cover the case for RLC UM;
Either modify or introduce a IE to cover the flow control for RLC UM, and also make it optionally present.

These solutions could apply on XnUP, F1UP, and X2UP interface protocol. According to certain embodiments, the enhanced DDDS is sent any time the assisting node desires, and it applies both for RLC UM and RLC AM modes.

There are, proposed herein, various embodiments which address one or more of the issues disclosed herein. Certain of these embodiments may provide one or more of the following technical advantages. According to certain embodiments, the user plan flow control downlink data delivery status can be used to feedback to the node hosting PDCP entity the desired buffer size related information only, reducing transmission of unnecessary information. According to certain embodiments, the solutions may also be used for RLC UM flow control. Certain embodiments may provide all, some, or none of these technical advantages. These and other technical advantages may be readily apparent and will be described in more detail below.

One exemplary embodiment comprises a method, implemented by a first network node (Node B), of reporting a Downlink Data Delivery Status (DDDS) for a wireless terminal from the first network node (Node B) to a second network node (Node A). The method comprises generating a DDDS frame comprising a first indicator and at least a first Information Element (IE) specifying a desired buffer size for a data bearer and/or a minimum desired buffer size for the wireless terminal. The method further comprises determining whether to include a second IE in the DDDS frame, where the second IE specifies a highest sequence number for a packet successfully delivered to the wireless terminal. The method further comprises setting a value of the first status indicator responsive to the determining whether to include the second IE in the DDDS frame to indicate a presence and/or an absence of the second IE in the DDDS frame. The method further comprises adding the second IE to the DDDS frame when the first status indicator indicates the presence of the second IE in the DDDS frame, and sending the DDDS frame to the second network node (Node A) to facilitate control, by the second network node (Node A), of downlink data flow to the wireless terminal.

Another exemplary embodiment comprises a computer program product for controlling a first network node (Node B). The computer program product comprises software instructions which, when run on at least one processing circuit in the first network node (Node B), causes the first network node (Node B) to execute a method of reporting a Downlink Data Delivery Status (DDDS) for a wireless terminal from the first network node (Node B) to a second network node (Node A). When run on the processing circuit, the software instructions cause the first network node (Node B) to generate a DDDS frame comprising a first indicator and at least a first Information Element (IE) specifying a desired buffer size for a data bearer and/or a minimum desired buffer size for the wireless terminal. When run on the processing circuit, the software instructions further cause the first network node (Node B) to determine whether to include a second IE in the DDDS frame, where the second IE specifies a highest sequence number for a packet successfully delivered to the wireless terminal. When run on the processing circuit, the software instructions further cause the first network node (Node B) to set a value of the first status indicator responsive to the determining whether to include the second IE in the DDDS frame to indicate a presence and/or an absence of the second IE in the DDDS frame. When run on the processing circuit, the software instructions further cause the first network node (Node B) to add the second IE to the DDDS frame when the first status indicator indicates the presence of the second IE in the DDDS frame, and send the DDDS frame to the second network node (Node A) to facilitate control, by the second network node (Node A), of downlink data flow to the wireless terminal. In one exemplary embodiment, a computer-readable medium comprises the computer program product. In one exemplary embodiment, the computer-readable medium may comprise a non-transitory computer-readable medium.

Another exemplary embodiment comprises a first network node (Node B) configured to report a Downlink Data Delivery Status (DDDS) for a wireless terminal to a second network node (Node A). The first network node (Node B) comprises one or more processing circuits and a communication circuit. The one or more processing circuits are configured to generate a DDDS frame comprising a first status indicator and at least a first Information Element (IE) specifying a desired buffer size for a data bearer and/or a minimum desired buffer size for the wireless terminal. The one or more processing circuits are further configured to determine whether to include a second IE in the DDDS frame, where the second IE specifies a highest sequence number for a packet successfully delivered to the wireless terminal. The one or more processing circuits are further configured to set a value of the first status indicator responsive to the determining to indicate a presence and/or an absence of the second IE in the DDDS frame, and to add the second IE to the DDDS frame when the first status indicator indicates the presence of the second IE in the DDDS frame. The communication circuit is configured to send the DDDS frame to the second network node (Node A) to facilitate control, by the second network node (Node A), of downlink data flow to the wireless terminal.

Another exemplary embodiment comprises a first network node (Node B) configured to report a Downlink Data Delivery Status (DDDS) for a wireless terminal to a second network node (Node A). The first network node (Node B) is configured to generate a DDDS frame comprising a first status indicator and at least a first Information Element (IE) specifying a desired buffer size for a data bearer and/or a minimum desired buffer size for the wireless terminal. The first network node (Node B) is further configured to determine whether to include a second IE in the DDDS frame, where the second IE specifies a highest sequence number fora packet successfully delivered to the wireless terminal. The first network node (Node B) is further configured to set a value of the first status indicator responsive to the determining to indicate a presence and/or an absence of the second IE in the DDDS frame, and add the second IE to the DDDS frame when the first status indicator indicates the presence of the second IE in the DDDS frame. The first network node (Node B) is further configured to send the DDDS frame to the second network node (Node A) to facilitate control, by the second network node (Node A), of downlink data flow to the wireless terminal.

Another exemplary embodiment comprises a method, implemented by a first network node (Node A) of controlling downlink data flow from the first network node (Node A) to a wireless terminal. The method comprises receiving, from a second network node (Node B), a Downlink Data Delivery Status (DDDS) frame comprising at least a first Information Element (IE) and a first status indicator. The method further comprises determining a desired buffer size for a data bearer and/or a minimum desired buffer size for the wireless terminal from the first IE in the DDDS frame. The method further comprises controlling the downlink data flow from the first network node (Node A) to the wireless terminal responsive to the determined desired buffer size for the data bearer and/or the determined minimum desired buffer size for the wireless terminal. The method further comprises evaluating the first status indicator in the DDDS frame to determine whether the DDDS frame includes a second IE. When the first status indicator indicates the DDDS frame includes the second IE, the method further comprises determining a highest sequence number for a packet successfully delivered by the first network node (Node A) to the wireless terminal from the second IE, and further controlling the downlink data flow from the first network node (Node A) to the wireless terminal responsive to the determined highest sequence number. The method further comprises sending downlink data to the wireless terminal according to the downlink data flow.

Another exemplary embodiment comprises a computer program product for controlling a first network node (Node A). The computer program product comprises software instructions which, when run on at least one processing circuit in the first network node (Node A), causes the first network node (Node A) to control downlink data flow from the first network node (Node A) to a wireless terminal. When run on the processing circuit, the software instructions cause the first network node (Node A) to receive, from a second network node (Node B), a Downlink Data Delivery Status (DDDS) frame comprising at least a first Information Element (IE) and a first status indicator. When run on the processing circuit, the software instructions further cause the first network node (Node A) to determine a desired buffer size for a data bearer and/or a minimum desired buffer size for the wireless terminal from the first IE in the DDDS frame. When run on the processing circuit, the software instructions further cause the first network node (Node A) to control the downlink data flow from the first network node (Node A) to the wireless terminal responsive to the determined desired buffer size for the data bearer and/or the determined minimum desired buffer size for the wireless terminal. When run on the processing circuit, the software instructions further cause the first network node (Node A) to evaluate the first status indicator in the DDDS frame to determine whether the DDDS frame includes a second IE. When the first status indicator indicates the DDDS frame includes the second IE, the software instruction further cause the first network node to determine a highest sequence number for a packet successfully delivered by the first network node (Node A) to the wireless terminal from the second IE, and to further control the downlink data flow from the first network node (Node A) to the wireless terminal responsive to the determined highest sequence number. When run on the processing circuit, the software instructions further cause the first network node (Node A) to send downlink data to the wireless terminal according to the downlink data flow. In one exemplary embodiment, a computer-readable medium comprises the computer program product. In one exemplary embodiment, the computer-readable medium comprises a non-transitory computer-readable medium.

Another exemplary embodiment comprises a first network node (Node A) configured to control downlink data flow to a wireless terminal. The first network node (Node A) comprises a communication circuit and one or more processing circuits. The communication circuit is configured to receive, from a second network node (Node B), a Downlink Data Delivery Status (DDDS) frame comprising at least a first Information Element (IE) and a first status indicator. The one or more processing circuits are configured to determine a desired buffer size for the data bearer and/or a minimum desired buffer size for the wireless terminal from the first IE in the DDDS frame. The one or more processing circuits are further configured to control the downlink data flow from the first network node (Node A) to the wireless terminal responsive to the determined desired buffer size for the data bearer and/or the determined minimum desired buffer size for the wireless terminal. The one or more processing circuits are further configured to evaluate the first status indicator in the DDDS frame to determine whether the DDDS frame includes a second IE. When the first status indicator indicates the DDDS frame includes the second IE, the one or more processing circuits are configured to determine a highest sequence number for a packet successfully delivered by the first network node (Node A) to the wireless terminal from the second IE, and further control the downlink data flow from the first network node (Node A) responsive to the determined highest sequence number. The communication circuit is further configured to send downlink data to the wireless terminal according to the downlink data flow.

Another exemplary embodiment comprises a first network node (Node A) for controlling downlink data flow from the first network node (Node A) to a wireless terminal. The first network node (Node A) is configured to receive, from a second network node (Node B), a Downlink Data Delivery Status (DDDS) frame comprising at least a first Information Element (IE) and a first status indicator. The first network node (Node A) is further configured to determine a desired buffer size for the data bearer and/or a minimum desired buffer size for the wireless terminal from the first IE in the DDDS frame. The first network node (Node A) is further configured to control the downlink data flow from the first network node (Node A) to the wireless terminal responsive to the determined desired buffer size for the data bearer and/or the determined minimum desired buffer size for the wireless terminal. The first network node (Node A) is further configured to evaluate the first status indicator in the DDDS frame to determine whether the DDDS frame includes a second IE. When the first status indicator indicates the DDDS frame includes the second IE, the first network node (Node A) is further configured to determine a highest sequence number for a packet successfully delivered by the first network node (Node A) to the wireless terminal from the second IE, and to further control the downlink data flow from the first network node (Node A) responsive to the determined highest sequence number. The first network node (Node A) is further configured to send downlink data to the wireless terminal according to the downlink data flow.

BRIEF DESCRIPTION OF THE DRAWINGS

FIG. 6 shows an example of Dual Connectivity in New Radio.

FIG. 7A shows an exemplary DDDS frame according to exemplary embodiments of the solution presented herein.

FIG. 7B shows another exemplary DDDS frame according to exemplary embodiments of the solution presented herein.

FIG. 7C shows another exemplary DDDS frame according to exemplary embodiments of the solution presented herein.

DETAILED DESCRIPTION

Some of the embodiments contemplated herein will now be described more fully with reference to the accompanying drawings. Other embodiments, however, are contained within the scope of the subject matter disclosed herein, and the disclosed subject matter should not be construed as limited to only the embodiments set forth herein; rather, these embodiments are provided by way of example to convey the scope of the subject matter to those skilled in the art. Additional information may also be found in the documents provided in the Appendix.

Figure 1:
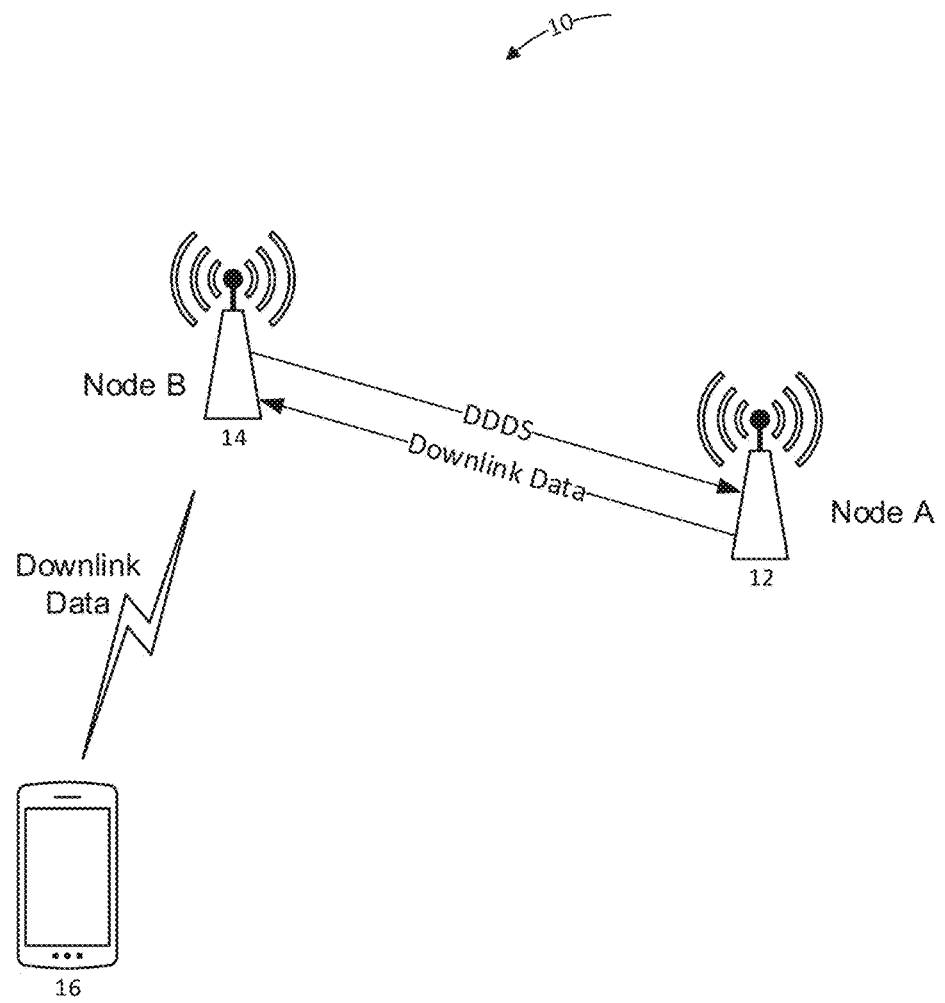
FIG. 1 shows an exemplary wireless network according to exemplary embodiments of the solution presented herein.

FIG. 1 shows an exemplary wireless network 10 comprising a Network Node A 12, a Network Node B 14, and a wireless terminal 16. Node B 14 sends a Downlink Data Delivery Status (DDDS) to Node A 12. Node A 12 uses the received DDDS to control the delivery of downlink data from Node A 12 to the wireless terminal 16 via Node B 14.

Figure 2:
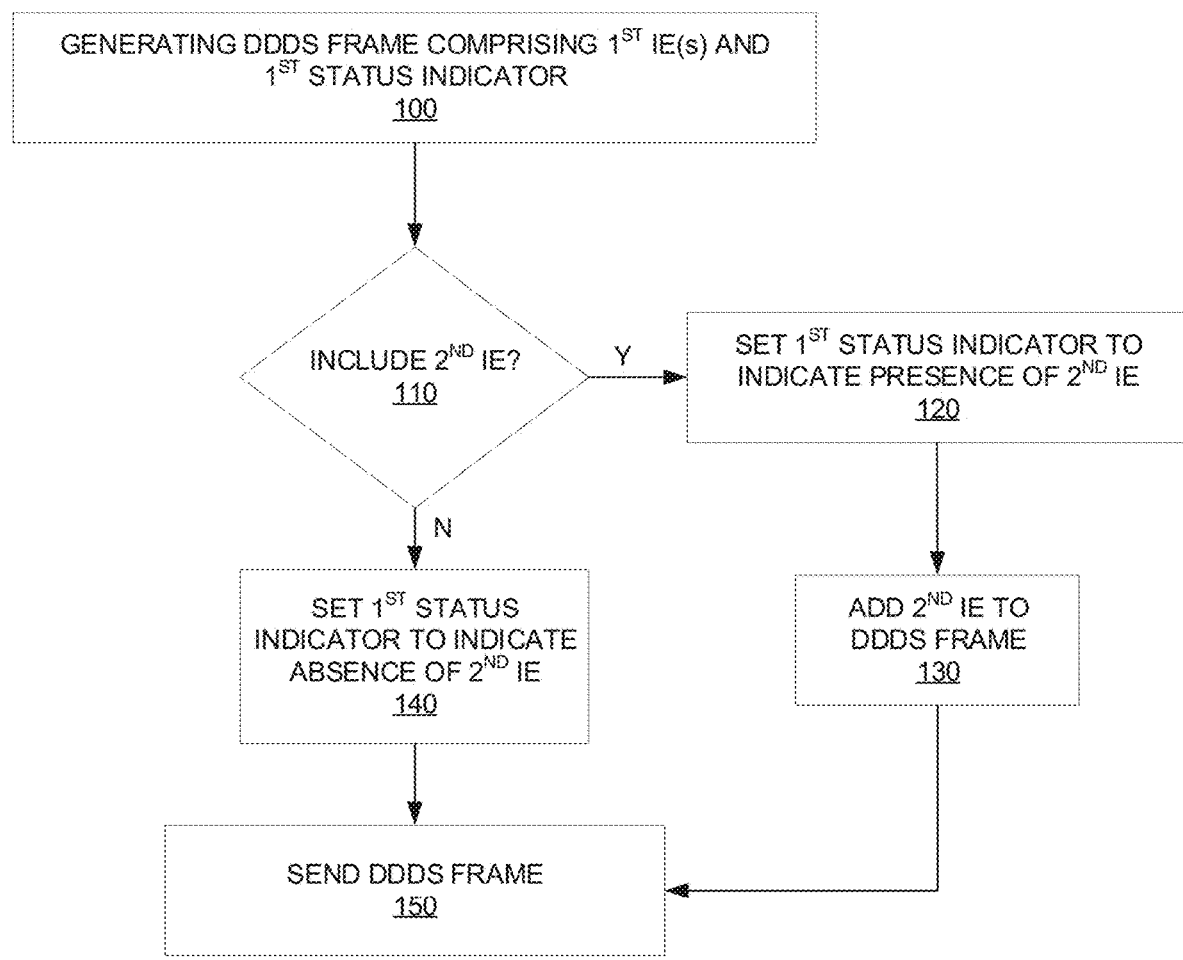
FIG. 2 shows a method for providing a DDDS frame from Node B to Node A according to exemplary embodiments of the solution presented herein.

FIG. 2 shows an exemplary method of reporting the DDDS for the wireless terminal 16 from Node B 14 to Node A 12, where the method is implemented by Node B 14. The method comprises generating a DDDS frame comprising a first indicator and at least a first Information Element (IE) specifying a desired buffer size for a data bearer and/or a minimum desired buffer size for the wireless terminal 16 (Block 100). The method further comprises determining whether to include a second IE in the DDDS frame (Block 110), where the second IE specifies a highest sequence number for a packet successfully delivered to the wireless terminal. The method further comprises setting a value of the first status indicator responsive to the determining whether to include the second IE in the DDDS frame to indicate a presence and/or an absence of the second IE in the DDDS frame (Block 120, Block 140). The method further comprises adding the second IE to the DDDS frame (Block 130) when the first status indicator indicates the presence of the second IE in the DDDS frame (Block 120), and sending the DDDS frame to Node A 12 to facilitate control, by Node A 12, of downlink data flow to the wireless terminal 16 (Block 150).

Figure 3:
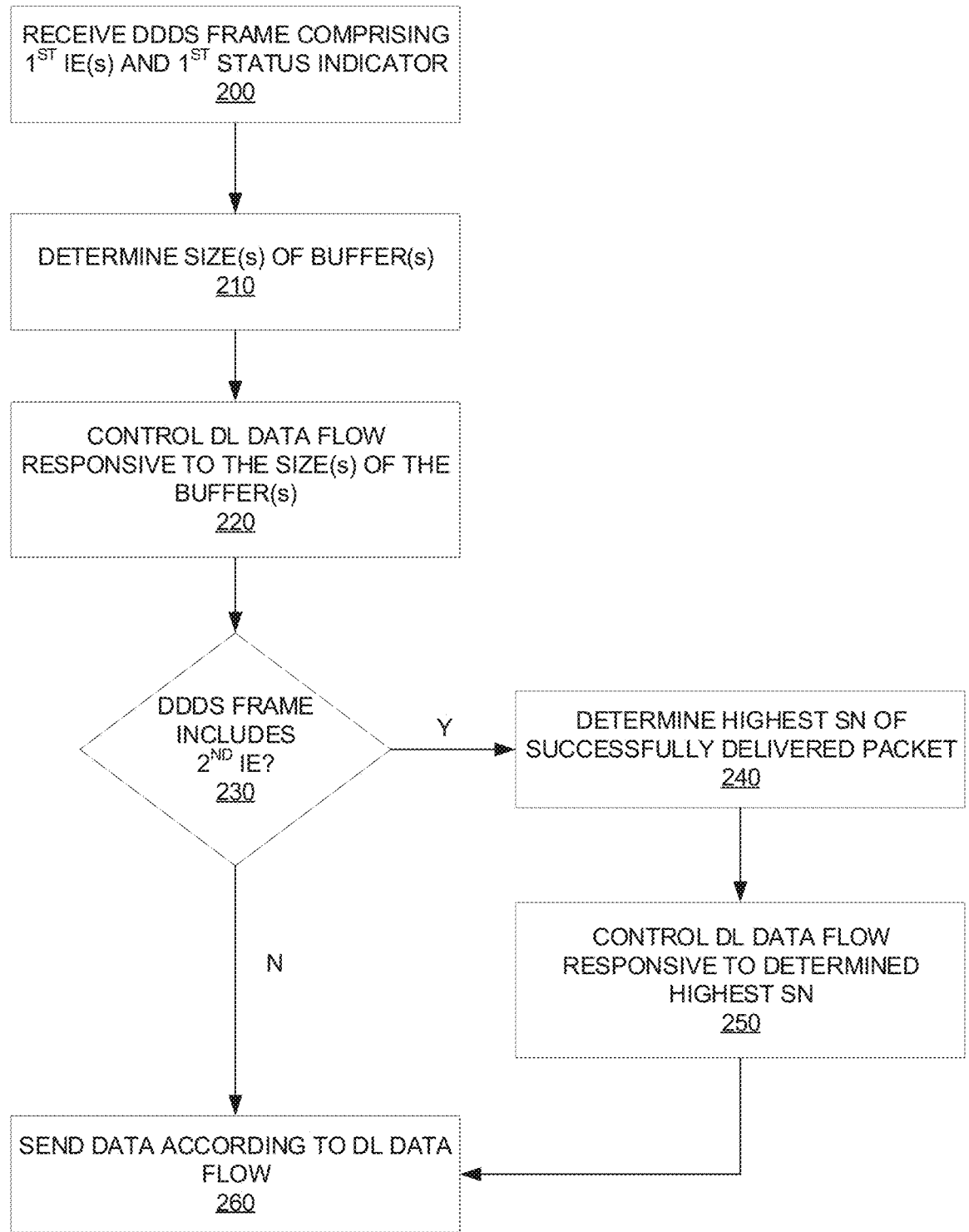
FIG. 3 shows a method for determining a data flow from a received DDDS frame, and providing data to the wireless terminal according to exemplary embodiments of the solution presented herein.

FIG. 3 shows an exemplary method, implemented by Node A 12, of controlling downlink data flow from Node A 12 to the wireless terminal 16. The method comprises receiving, from Node B 14, a DDDS frame comprising at least a first Information Element (IE) and a first status indicator (Block 200). The method further comprises determining a desired buffer size for a data bearer and/or a minimum desired buffer size for the wireless terminal 16 from the first IE in the DDDS frame (Block 210). The method further comprises controlling the downlink data flow from Node A 12 to the wireless terminal 16 responsive to the determined desired buffer size for the data bearer and/or the determined minimum desired buffer size for the wireless terminal 16 (Block 220). The method further comprises evaluating the first status indicator in the DDDS frame to determine whether the DDDS frame includes a second IE (Block 230). When the first status indicator indicates the DDDS frame includes the second IE, the method further comprises determining a highest sequence number for a packet successfully delivered by Node A 12 to the wireless terminal 16 from the second IE (Block 240), and further controlling the downlink data flow from Node A 12 to the wireless terminal 16 responsive to the determined highest sequence number (Block 250). The method further comprises sending downlink data to the wireless terminal 16 according to the downlink data flow (Block 260).

Figure 4:
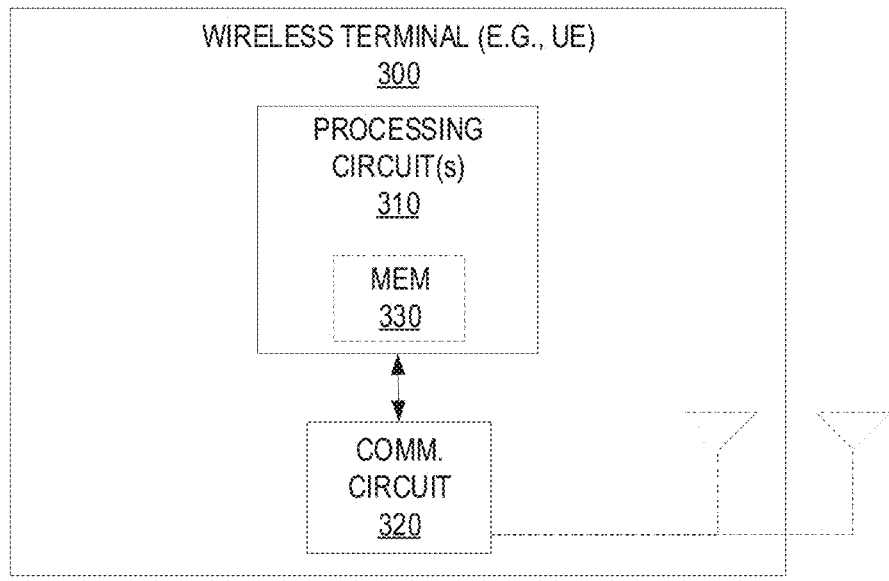
FIG. 4 shows a block diagram for an exemplary wireless terminal according to exemplary embodiments of the solution presented herein.

FIG. 4 shows a block diagram for an exemplary wireless terminal 300, which corresponds to the wireless terminal 16 in FIG. 1. The wireless terminal 300 comprises one or more processing circuits 310 that control the operation of the wireless terminal 300 according to at least the instructions stored in memory 330. The wireless terminal 300 further comprises communication circuit 320 configured to transmit and/or receive wireless signals in the wireless network, e.g., to/from Node B 14.

Figure 5:
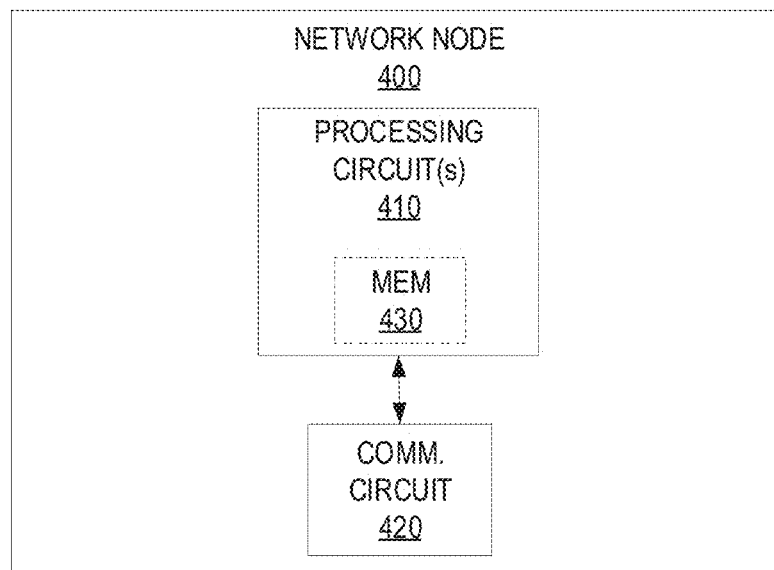
FIG. 5 shows a block diagram for an exemplary network node according to exemplary embodiments of the solution presented herein.

FIG. 5 shows a block diagram for an exemplary network node 400, which corresponds to either or both of Node A 12 and Node B of FIG. 1. The network node 400 comprises a one or more processing circuits 410, communication circuit 420, and memory 430. The one or more processing circuits 310 control the operation of the network node 400 according to at least the instructions stored in memory 430. The communication circuit 420 is configured to transmit and/or receive signals in the wireless network, e.g., to/from other network nodes 400 and/or to/from the wireless terminal 16.

When network node 400 comprises Node A 12, the communication circuit 420 is configured to receive, from another network node, e.g., Node B 14, a DDDS frame comprising at least a first IE and a first status indicator. The one or more processing circuits 410 are configured to determine a desired buffer size for the data bearer and/or a minimum desired buffer size for the wireless terminal 16 from the first IE in the DDDS frame. The one or more processing circuits 410 are further configured to control the downlink data flow from Node A 12 to the wireless terminal 16 responsive to the determined desired buffer size for the data bearer and/or the determined minimum desired buffer size for the wireless terminal. The one or more processing circuits 410 are further configured to evaluate the first status indicator in the DDDS frame to determine whether the DDDS frame includes a second IE. When the first status indicator indicates the DDDS frame includes the second IE, the one or more processing circuits are configured to determine a highest sequence number for a packet successfully delivered by Node A 12 to the wireless terminal 16 from the second IE, and further control the downlink data flow from Node A 12 responsive to the determined highest sequence number. The communication circuit 420 is further configured to send downlink data to the wireless terminal 16 according to the downlink data flow.

When the network node 400 comprises Node B 14, the one or more processing circuits 410 are configured to generate a DDDS frame comprising a first status indicator and at least a first Information Element (IE) specifying a desired buffer size for a data bearer and/or a minimum desired buffer size for the wireless terminal 16. The one or more processing circuits 410 are further configured to determine whether to include a second IE in the DDDS frame, where the second IE specifies a highest sequence number for a packet successfully delivered to the wireless terminal 16. The one or more processing circuits 410 are further configured to set a value of the first status indicator responsive to the determining to indicate a presence and/or an absence of the second IE in the DDDS frame, and to add the second IE to the DDDS frame when the first status indicator indicates the presence of the second IE in the DDDS frame. The communication circuit 420 is configured to send the DDDS frame to Node A 12 to facilitate control, by Node A 12, of downlink data flow to the wireless terminal 16.

To ensure the DDDS can be sent only containing the desired buffer size related information (for example before the data delivery), according to certain embodiments the mandatory presented IE "the highest PDCP PDU sequence number successfully delivered in sequence to the UE among those PDCP PDUs received from the gNB hosting the PDCP entity" is modified to be optional. A new indication is introduced to indicate the presence of this IE. For example, one way to implement the solution presented herein is to allocate one of the spare bits and define an indication, as shown in FIG. 7A and in Table 1. In the example of FIG. 7A, the "Highest PDCP Delivered Ind" is introduced to indicate the presence of the "Highest successfully delivered PDCP Sequence Number" IE.

TABLE 1

Highest PDCP Delivered Indication

Description: This parameter indicates the presence of the Highest successfully delivered PDCP Sequence Number.
Value range: {0 = Highest successfully delivered PDCP Sequence Number not present, 1 = Highest successfully delivered PDCP Sequence Number present}.

According to certain embodiments, an alternative solution could be that an indication is introduced by using the existing spare bits to say whether the PDCP PDU SN information is new or just a repetition, e.g., the same as last signaled, in which case the PDCP PDU SN is not presented.

According to certain embodiments, an alternative solution could be that an indication is introduced by using the existing spare bits to say that the PDCP PDU SN information can be ignored, e.g., when the indication is set, the PDCP PDU presented is dummy and not used, as shown in refer to FIG. 7B. In the example of FIG. 7B, the "Highest PDCP Delivered Relevant" is introduced to indicate if the "Highest successfully delivered PDCP Sequence Number" IE is relevant or not. When this Indication is set (e.g., to 1), the Highest successfully delivered PDCP Sequence Number could be a dummy value.

As X2UP is already standardized (see 3GPP TS 36.425), the introduction of the above presence indication should be made in a manner that is backwards compatible, for example, when using the spare bit, use value 0 to indicate the IE is present, and value 1 to indicate the IE is not present, due to the fact that the spare bits are set to 0.

For RLC UM flow control, it is sufficient to get feedbacks on what had been transmitted to the lower layer (e.g., Medium Access Control (MAC) layer). To make the DDDS applicable for RLC UM mode flow control, the definition of the "desired buffer size" and the "minimum desired buffer size" needs to be extended, to clearly state it is the desired buffer size to be transmitted to the MAC layer, in order to cover the RLC UM mode. One non-limiting example of this is shown in Table 2, although other specific implementations may also be possible. In particular, Table 2 shows an example of extending the desired buffer size to clear state the case of transmitting to MAC layer, to cover the RLC UM mode.

TABLE 2

Information of the currently desired buffer size at the SgNB for transmitting to the UE user data or MAC layer associated with a specific data bearer configured with the split bearer option;
Information of the currently minimum desired buffer size at the SgNB for transmitting to the UE user data or MAC layer associated with all data bearers configured with the split bearer option.

The highest transmitted PDCP Sequence Number can be introduced to be used both for RLC UM and RLC AM mode. It is meant to indicate the highest PDCP SN that has been requested by MAC layer for transmission over the Uu interface. When it is used for RLC AM mode, it should not be used by the node hosting the PDCP entity to remove the PDCP PDU, however. This information element should also be introduced as optionally present. An indication is introduced to indicate the presence of this IE. One non-limiting example is shown in FIG. 7C and Table 3, although other specific implementations may also be possible.

TABLE 3

Highest PDCP Transmitted Indication

Description: This parameter indicates the presence of the Highest transmitted PDCP Sequence Number.
Value range: {0 = Highest transmitted PDCP Sequence Number not present, 1 = Highest transmitted PDCP Sequence Number present}.
Field length: 1 bit.

The solution may apply for X2UP, XnUP and F1UP. The indications and information elements may be introduced in different places or with different names.

As discussed herein, the proposed solutions may be performed by various network nodes and UEs operating in a dual connectivity setting. These nodes and UEs, as well as the network they operate in, will now be described in more detail.

Figure 8:
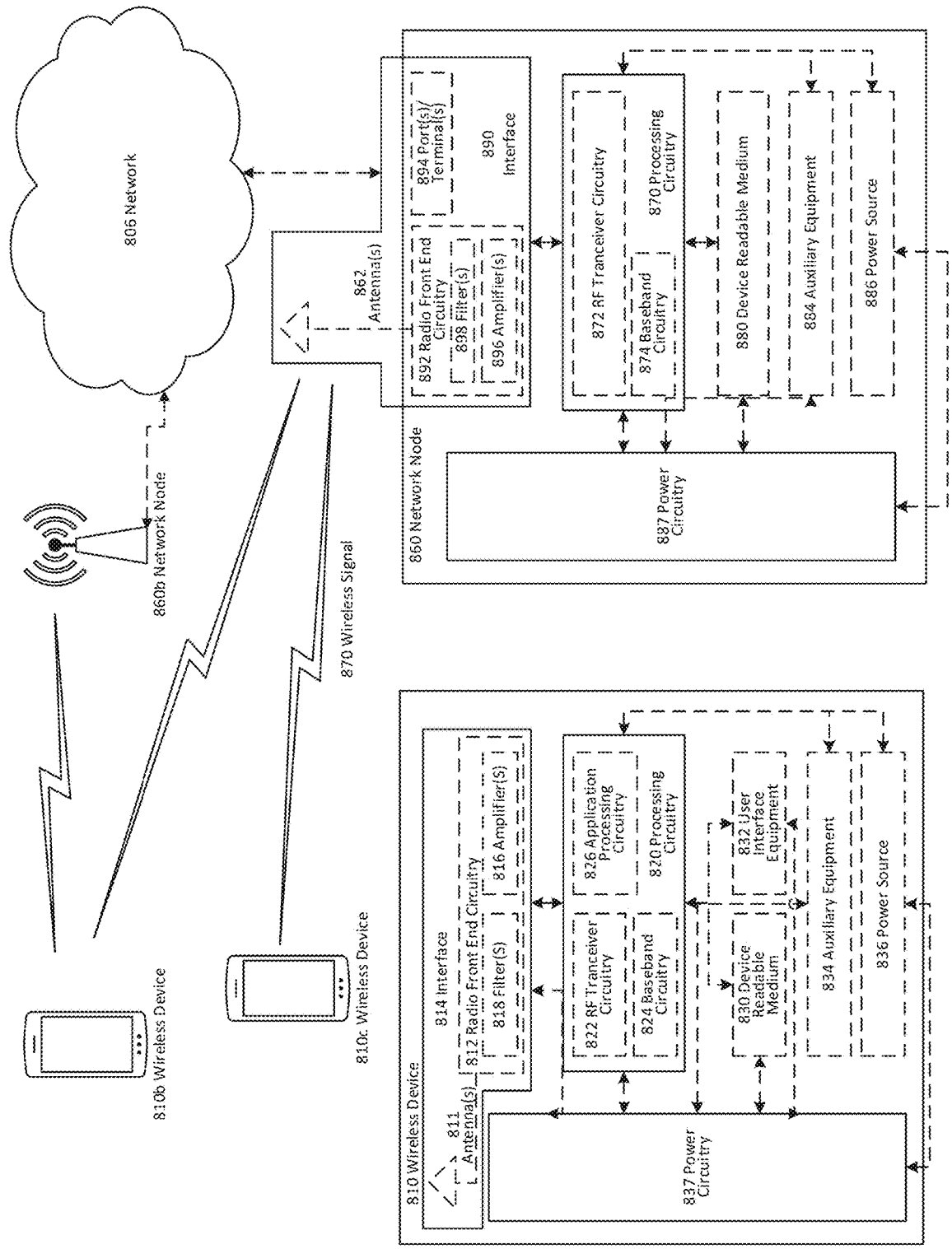
FIG. 8 shows an exemplary wireless network applicable to the solution presented herein.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 806, network nodes 860 and 860b, and WDs 810, 810b, and 810c. In practice, a wireless network may further include any additional elements suitable to support communication between wireless devices or between a wireless device and another communication device, such as a landline telephone, a service provider, or any other network node or end device. Of the illustrated components, network node 860 and wireless device (WD) 810 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system.

In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 860 and WD 810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 860 includes processing circuitry 870, device readable medium 880, interface 890, auxiliary equipment 884, power source 886, power circuitry 887, and antenna 862. Although network node 860 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 860 are depicted as single boxes located within a larger box, or nested within multiple boxes, in practice, a network node may comprise multiple different physical components that make up a single illustrated component (e.g., device readable medium 880 may comprise multiple separate hard drives as well as multiple RAM modules).

Similarly, network node 860 may be composed of multiple physically separate components (e.g., a NodeB component and a RNC component, or a BTS component and a BSC component, etc.), which may each have their own respective components. In certain scenarios in which network node 860 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 860 may be configured to support multiple radio access technologies (RATs). In such embodiments, some components may be duplicated (e.g., separate device readable medium 880 for the different RATs) and some components may be reused (e.g., the same antenna 862 may be shared by the RATs). Network node 860 may also include multiple sets of the various illustrated components for different wireless technologies integrated into network node 860, such as, for example, GSM, WCDMA, LTE, NR, WiFi, or Bluetooth wireless technologies. These wireless technologies may be integrated into the same or different chip or set of chips and other components within network node 860.

Processing circuitry 870 is configured to perform any determining, calculating, or similar operations (e.g., certain obtaining operations) described herein as being provided by a network node. These operations performed by processing circuitry 870 may include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Processing circuitry 870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 860 components, such as device readable medium 880, network node 860 functionality. For example, processing circuitry 870 may execute instructions stored in device readable medium 880 or in memory within processing circuitry 870. Such functionality may include providing any of the various wireless features, functions, or benefits discussed herein. In some embodiments, processing circuitry 870 may include a system on a chip (SOC).

In some embodiments, processing circuitry 870 may include one or more of radio frequency (RF) transceiver circuitry 872 and baseband processing circuitry 874. In some embodiments, radio frequency (RF) transceiver circuitry 872 and baseband processing circuitry 874 may be on separate chips (or sets of chips), boards, or units, such as radio units and digital units. In alternative embodiments, part or all of RF transceiver circuitry 872 and baseband processing circuitry 874 may be on the same chip or set of chips, boards, or units In certain embodiments, some or all of the functionality described herein as being provided by a network node, base station, eNB or other such network device may be performed by processing circuitry 870 executing instructions stored on device readable medium 880 or memory within processing circuitry 870. In alternative embodiments, some or all of the functionality may be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of network node 860, but are enjoyed by network node 860 as a whole, and/or by end users and the wireless network generally.

Device readable medium 880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 870. Device readable medium 880 may store any suitable instructions, data or information, including a computer program, software, an application including one or more of logic, rules, code, tables, etc. and/or other instructions capable of being executed by processing circuitry 870 and, utilized by network node 860. Device readable medium 880 may be used to store any calculations made by processing circuitry 870 and/or any data received via interface 890. In some embodiments, processing circuitry 870 and device readable medium 880 may be considered to be integrated.

Interface 890 is used in the wired or wireless communication of signalling and/or data between network node 860, network 806, and/or WDs 810. As illustrated, interface 890 comprises port(s)/terminal(s) 894 to send and receive data, for example to and from network 806 over a wired connection. Interface 890 also includes radio front end circuitry 892 that may be coupled to, or in certain embodiments a part of, antenna 862. Radio front end circuitry 892 comprises filters 898 and amplifiers 896. Radio front end circuitry 892 may be connected to antenna 862 and processing circuitry 870. Radio front end circuitry may be configured to condition signals communicated between antenna 862 and processing circuitry 870. Radio front end circuitry 892 may receive digital data that is to be sent out to other network nodes or WDs via a wireless connection. Radio front end circuitry 892 may convert the digital data into a radio signal having the appropriate channel and bandwidth parameters using a combination of filters 898 and/or amplifiers 896. The radio signal may then be transmitted via antenna 862. Similarly, when receiving data, antenna 862 may collect radio signals which are then converted into digital data by radio front end circuitry 892. The digital data may be passed to processing circuitry 870. In other embodiments, the interface may comprise different components and/or different combinations of components.

In certain alternative embodiments, network node 860 may not include separate radio front end circuitry 892, instead, processing circuitry 870 may comprise radio front end circuitry and may be connected to antenna 862 without separate radio front end circuitry 892. Similarly, in some embodiments, all or some of RF transceiver circuitry 872 may be considered a part of interface 890. In still other embodiments, interface 890 may include one or more ports or terminals 894, radio front end circuitry 892, and RF transceiver circuitry 872, as part of a radio unit (not shown), and interface 890 may communicate with baseband processing circuitry 874, which is part of a digital unit (not shown).

Antenna 862 may include one or more antennas, or antenna arrays, configured to send and/or receive wireless signals. Antenna 862 may be coupled to radio front end circuitry 892 and may be any type of antenna capable of transmitting and receiving data and/or signals wirelessly. In some embodiments, antenna 862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 862 may be separate from network node 860 and may be connectable to network node 860 through an interface or port.

Antenna 862, interface 890, and/or processing circuitry 870 may be configured to perform any receiving operations and/or certain obtaining operations described herein as being performed by a network node. Any information, data and/or signals may be received from a wireless device, another network node and/or any other network equipment. Similarly, antenna 862, interface 890, and/or processing circuitry 870 may be configured to perform any transmitting operations described herein as being performed by a network node. Any information, data and/or signals may be transmitted to a wireless device, another network node and/or any other network equipment.

Power circuitry 887 may comprise, or be coupled to, power management circuitry and is configured to supply the components of network node 860 with power for performing the functionality described herein. Power circuitry 887 may receive power from power source 886. Power source 886 and/or power circuitry 887 may be configured to provide power to the various components of network node 860 in a form suitable for the respective components (e.g., at a voltage and current level needed for each respective component). Power source 886 may either be included in, or external to, power circuitry 887 and/or network node 860. For example, network node 860 may be connectable to an external power source (e.g., an electricity outlet) via an input circuitry or interface such as an electrical cable, whereby the external power source supplies power to power circuitry 887. As a further example, power source 886 may comprise a source of power in the form of a battery or battery pack which is connected to, or integrated in, power circuitry 887. The battery may provide backup power should the external power source fail. Other types of power sources, such as photovoltaic devices, may also be used.

Alternative embodiments of network node 860 may include additional components beyond those shown in FIG. 8 that may be responsible for providing certain aspects of the network node's functionality, including any of the functionality described herein and/or any functionality necessary to support the subject matter described herein. For example, network node 860 may include user interface equipment to allow input of information into network node 860 and to allow output of information from network node 860. This may allow a user to perform diagnostic, maintenance, repair, and other administrative functions for network node 860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine-type communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 810 includes antenna 811, interface 814, processing circuitry 820, device readable medium 830, user interface equipment 832, auxiliary equipment 834, power source 836 and power circuitry 837. WD 810 may include multiple sets of one or more of the illustrated components for different wireless technologies supported by WD 810, such as, for example, GSM, WCDMA, LTE, NR, WiFi, WiMAX, or Bluetooth wireless technologies, just to mention a few. These wireless technologies may be integrated into the same or different chips or set of chips as other components within WD 810.

Antenna 811 may include one or more antennas or antenna arrays configured to send and/or receive wireless signals, where the antenna 811 is connected to interface 814. In certain alternative embodiments, antenna 811 may be separate from WD 810 and be connectable to WD 810 through an interface or port. Antenna 811, interface 814, and/or processing circuitry 820 may be configured to perform any receiving or transmitting operations described herein as being performed by a WD. Any information, data and/or signals may be received from a network node and/or another WD. In some embodiments, radio front end circuitry and/or antenna 811 may be considered an interface.

As illustrated, interface 814 comprises radio front end circuitry 812 and antenna 811. Radio front end circuitry 812 comprise one or more filters 818 and amplifiers 816. Radio front end circuitry 812 is connected to antenna 811 and processing circuitry 820, and is configured to condition signals communicated between antenna 811 and processing circuitry 820. Radio front end circuitry 812 may be coupled to or a part of antenna 811. In some embodiments, WD 810 may not include separate radio front end circuitry 812; rather, processing circuitry 820 may comprise radio front end circuitry and may be connected to antenna 811. Similarly, in some embodiments, some or all of RF transceiver circuitry 822 may be considered a part of interface 814. Radio front end circuitry 812 may receive digital data that is to be sent out to other network nodes or WDs via a wireless connection. Radio front end circuitry 812 may convert the digital data into a radio signal having the appropriate channel and bandwidth parameters using a combination of filters 818 and/or amplifiers 816. The radio signal may then be transmitted via antenna 811. Similarly, when receiving data, antenna 811 may collect radio signals which are then converted into digital data by radio front end circuitry 812. The digital data may be passed to processing circuitry 820. In other embodiments, the interface may comprise different components and/or different combinations of components.

Processing circuitry 820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 810 components, such as device readable medium 830, WD 810 functionality. Such functionality may include providing any of the various wireless features or benefits discussed herein. For example, processing circuitry 820 may execute instructions stored in device readable medium 830 or in memory within processing circuitry 820 to provide the functionality disclosed herein.

As illustrated, processing circuitry 820 includes one or more of RF transceiver circuitry 822, baseband processing circuitry 824, and application processing circuitry 826. In other embodiments, the processing circuitry may comprise different components and/or different combinations of components. In certain embodiments processing circuitry 820 of WD 810 may comprise a SOC. In some embodiments, RF transceiver circuitry 822, baseband processing circuitry 824, and application processing circuitry 826 may be on separate chips or sets of chips. In alternative embodiments, part or all of baseband processing circuitry 824 and application processing circuitry 826 may be combined into one chip or set of chips, and RF transceiver circuitry 822 may be on a separate chip or set of chips. In still alternative embodiments, part or all of RF transceiver circuitry 822 and baseband processing circuitry 824 may be on the same chip or set of chips, and application processing circuitry 826 may be on a separate chip or set of chips. In yet other alternative embodiments, part or all of RF transceiver circuitry 822, baseband processing circuitry 824, and application processing circuitry 826 may be combined in the same chip or set of chips. In some embodiments, RF transceiver circuitry 822 may be a part of interface 814. RF transceiver circuitry 822 may condition RF signals for processing circuitry 820.

In certain embodiments, some or all of the functionality described herein as being performed by a WD may be provided by processing circuitry 820 executing instructions stored on device readable medium 830, which in certain embodiments may be a computer-readable storage medium. In alternative embodiments, some or all of the functionality may be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 may be configured to perform any determining, calculating, or similar operations (e.g., certain obtaining operations) described herein as being performed by a WD. These operations, as performed by processing circuitry 820, may include processing information obtained by processing circuitry 820 by, for example, converting the obtained information into other information, comparing the obtained information or converted information to information stored by WD 810, and/or performing one or more operations based on the obtained information or converted information, and as a result of said processing making a determination.

Device readable medium 830 may be operable to store a computer program, software, an application including one or more of logic, rules, code, tables, etc. and/or other instructions capable of being executed by processing circuitry 820. Device readable medium 830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 820. In some embodiments, processing circuitry 820 and device readable medium 830 may be considered to be integrated.

User interface equipment 832 may provide components that allow for a human user to interact with WD 810. Such interaction may be of many forms, such as visual, audial, tactile, etc. User interface equipment 832 may be operable to produce output to the user and to allow the user to provide input to WD 810. The type of interaction may vary depending on the type of user interface equipment 832 installed in WD 810. For example, if WD 810 is a smart phone, the interaction may be via a touch screen; if WD 810 is a smart meter, the interaction may be through a screen that provides usage (e.g., the number of gallons used) or a speaker that provides an audible alert (e.g., if smoke is detected). User interface equipment 832 may include input interfaces, devices and circuits, and output interfaces, devices and circuits. User interface equipment 832 is configured to allow input of information into WD 810, and is connected to processing circuitry 820 to allow processing circuitry 820 to process the input information. User interface equipment 832 may include, for example, a microphone, a proximity or other sensor, keys/buttons, a touch display, one or more cameras, a USB port, or other input circuitry. User interface equipment 832 is also configured to allow output of information from WD 810, and to allow processing circuitry 820 to output information from WD 810. User interface equipment 832 may include, for example, a speaker, a display, vibrating circuitry, a USB port, a headphone interface, or other output circuitry. Using one or more input and output interfaces, devices, and circuits, of user interface equipment 832, WD 810 may communicate with end users and/or the wireless network, and allow them to benefit from the functionality described herein.

Auxiliary equipment 834 is operable to provide more specific functionality which may not be generally performed by WDs. This may comprise specialized sensors for doing measurements for various purposes, interfaces for additional types of communication such as wired communications etc. The inclusion and type of components of auxiliary equipment 834 may vary depending on the embodiment and/or scenario.

Power source 836 may, in some embodiments, be in the form of a battery or battery pack. Other types of power sources, such as an external power source (e.g., an electricity outlet), photovoltaic devices or power cells, may also be used. WD 810 may further comprise power circuitry 837 for delivering power from power source 836 to the various parts of WD 810 which need power from power source 836 to carry out any functionality described or indicated herein. Power circuitry 837 may in certain embodiments comprise power management circuitry. Power circuitry 837 may additionally or alternatively be operable to receive power from an external power source; in which case WD 810 may be connectable to the external power source (such as an electricity outlet) via input circuitry or an interface such as an electrical power cable. Power circuitry 837 may also in certain embodiments be operable to deliver power from an external power source to power source 836. This may be, for example, for the charging of power source 836. Power circuitry 837 may perform any formatting, converting, or other modification to the power from power source 836 to make the power suitable for the respective components of WD 810 to which power is supplied.

Figure 9:
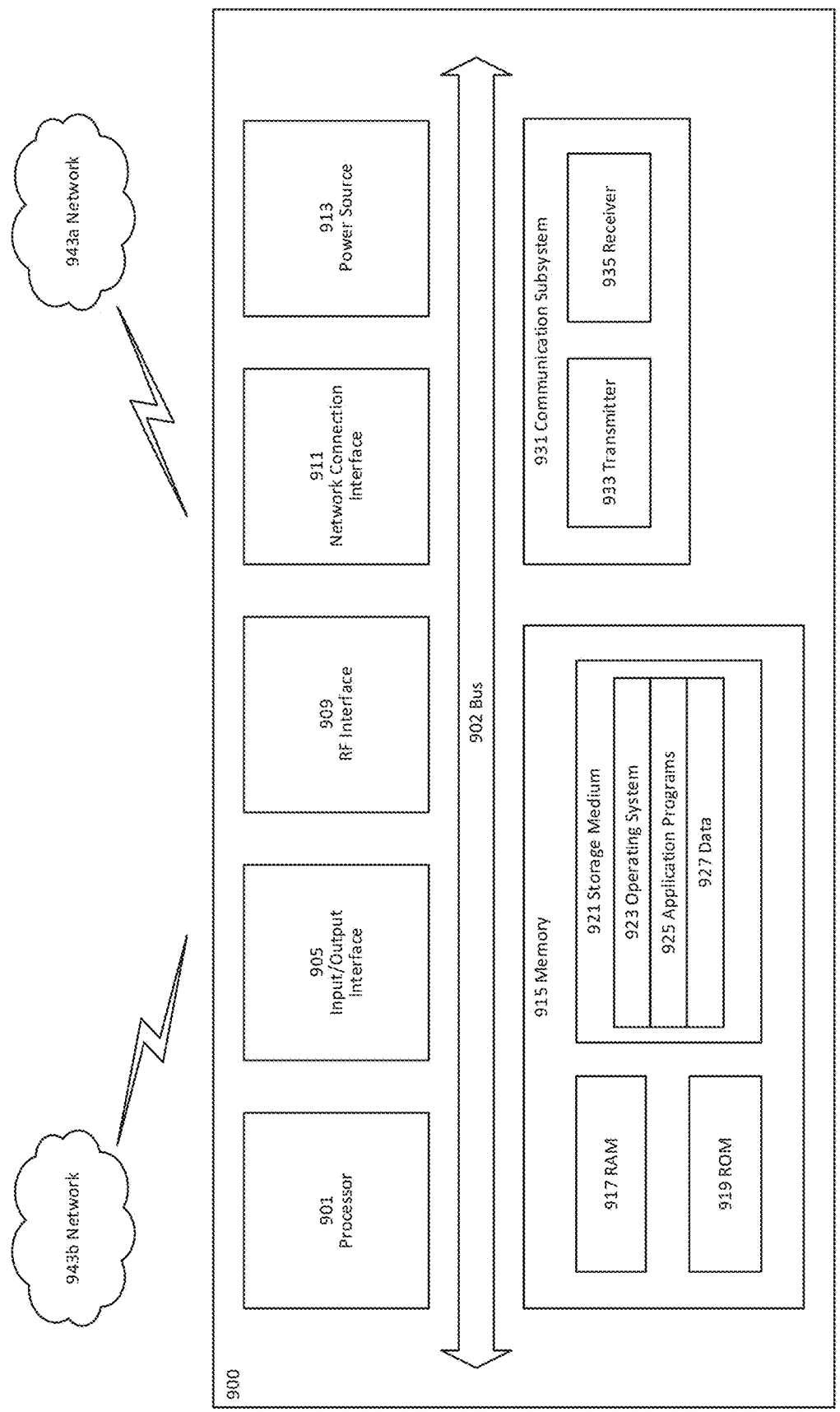
FIG. 9 shows an exemplary UE applicable to the solution presented herein.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user. A UE may also comprise any UE identified by the 3rd Generation Partnership Project (3GPP), including a NB-IoT UE that is not intended for sale to, or operation by, a human user. UE 900, as illustrated in FIG. 9, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 900 includes processing circuitry 901 that is operatively coupled to input/output interface 905, radio frequency (RF) interface 909, network connection interface 911, memory 915 including random access memory (RAM) 917, read-only memory (ROM) 919, and storage medium 921 or the like, communication subsystem 931, power source 913, and/or any other component, or any combination thereof. Storage medium 921 includes operating system 923, application program 925, and data 927. In other embodiments, storage medium 921 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 901 may be configured to process computer instructions and data. Processing circuitry 901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 901 may include two central processing units (CPUs). Data may be information in a form suitable for use by a computer.

In the depicted embodiment, input/output interface 905 may be configured to provide a communication interface to an input device, output device, or input and output device. UE 900 may be configured to use an output device via input/output interface 905. An output device may use the same type of interface port as an input device. For example, a USB port may be used to provide input to and output from UE 900. The output device may be a speaker, a sound card, a video card, a display, a monitor, a printer, an actuator, an emitter, a smartcard, another output device, or any combination thereof. UE 900 may be configured to use an input device via input/output interface 905 to allow a user to capture information into UE 900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 909 may be configured to provide a communication interface to RF components such as a transmitter, a receiver, and an antenna. Network connection interface 911 may be configured to provide a communication interface to network 943*a*. Network 943*a* may encompass wired and/or wireless networks such as a local-area network (LAN), a wide-area network (WAN), a computer network, a wireless network, a telecommunications network, another like network or any combination thereof. For example, network 943*a* may comprise a Wi-Fi network. Network connection interface 911 may be configured to include a receiver and a transmitter interface used to communicate with one or more other devices over a communication network according to one or more communication protocols, such as Ethernet, TCP/IP, SONET, ATM, or the like. Network connection interface 911 may implement receiver and transmitter functionality appropriate to the communication network links (e.g., optical, electrical, and the like). The transmitter and receiver functions may share circuit components, software or firmware, or alternatively may be implemented separately.

RAM 917 may be configured to interface via bus 902 to processing circuitry 901 to provide storage or caching of data or computer instructions during the execution of software programs such as the operating system, application programs, and device drivers. ROM 919 may be configured to provide computer instructions or data to processing circuitry 901. For example, ROM 919 may be configured to store invariant low-level system code or data for basic system functions such as basic input and output (I/O), startup, or reception of keystrokes from a keyboard that are stored in a non-volatile memory. Storage medium 921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 921 may be configured to include operating system 923, application program 925 such as a web browser application, a widget or gadget engine or another application, and data file 927. Storage medium 921 may store, for use by UE 900, any of a variety of various operating systems or combinations of operating systems.

Storage medium 921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 921 may allow UE 900 to access computer-executable instructions, application programs or the like, stored on transitory or non-transitory memory media, to off-load data, or to upload data. An article of manufacture, such as one utilizing a communication system may be tangibly embodied in storage medium 921, which may comprise a device readable medium.

In FIG. 9, processing circuitry 901 may be configured to communicate with network 943b using communication subsystem 931. Network 943a and network 943b may be the same network or networks or different network or networks. Communication subsystem 931 may be configured to include one or more transceivers used to communicate with network 943b. For example, communication subsystem 931 may be configured to include one or more transceivers used to communicate with one or more remote transceivers of another device capable of wireless communication such as another WD, UE, or base station of a radio access network (RAN) according to one or more communication protocols, such as IEEE 802.9, CDMA, WCDMA, GSM, LTE, UTRAN, WiMax, or the like. Each transceiver may include transmitter 933 and/or receiver 935 to implement transmitter or receiver functionality, respectively, appropriate to the RAN links (e.g., frequency allocations and the like). Further, transmitter 933 and receiver 935 of each transceiver may share circuit components, software or firmware, or alternatively may be implemented separately.

In the illustrated embodiment, the communication functions of communication subsystem 931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 may include cellular communication, Wi-Fi communication, Bluetooth communication, and GPS communication. Network 943b may encompass wired and/or wireless networks such as a local-area network (LAN), a wide-area network (WAN), a computer network, a wireless network, a telecommunications network, another like network or any combination thereof. For example, network 943b may be a cellular network, a Wi-Fi network, and/or a near-field network. Power source 913 may be configured to provide alternating current (AC) or direct current (DC) power to components of UE 900.

The features, benefits and/or functions described herein may be implemented in one of the components of UE 900 or partitioned across multiple components of UE 900. Further, the features, benefits, and/or functions described herein may be implemented in any combination of hardware, software or firmware. In one example, communication subsystem 931 may be configured to include any of the components described herein. Further, processing circuitry 901 may be configured to communicate with any of such components over bus 902. In another example, any of such components may be represented by program instructions stored in memory that when executed by processing circuitry 901 perform the corresponding functions described herein. In another example, the functionality of any of such components may be partitioned between processing circuitry 901 and communication subsystem 931. In another example, the non-computationally intensive functions of any of such components may be implemented in software or firmware and the computationally intensive functions may be implemented in hardware.

Figure 10:
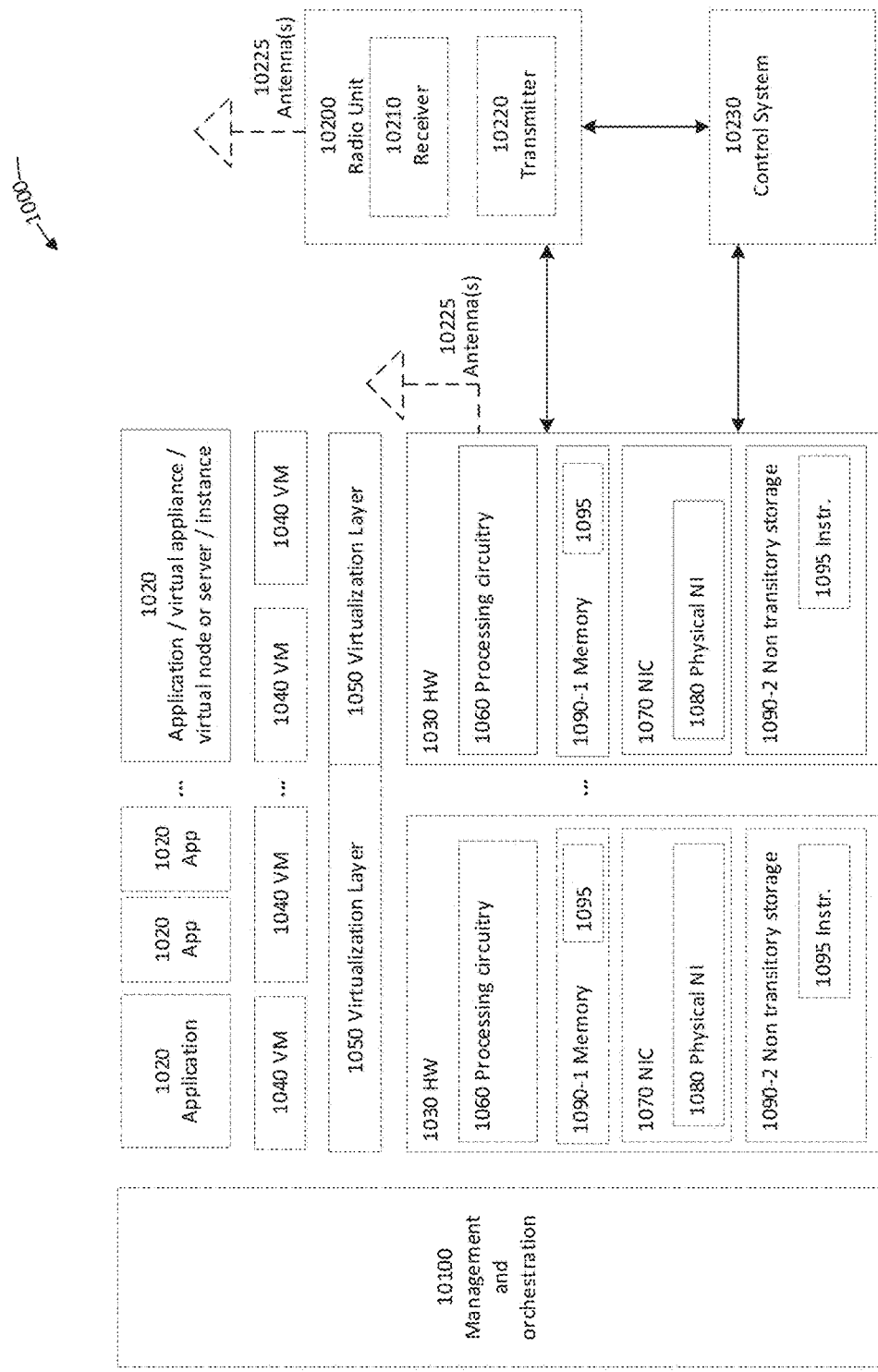
FIG. 10 shows an exemplary virtualization environment applicable to the solution presented herein.

FIG. 10 is a schematic block diagram illustrating a virtualization environment 1000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000, comprises general-purpose or special-purpose network hardware devices 1030 comprising a set of one or more processors or processing circuitry 1060, which may be commercial off-the-shelf (COTS) processors, dedicated Application Specific Integrated Circuits (ASICs), or any other type of processing circuitry including digital or analog hardware components or special purpose processors. Each hardware device may comprise memory 1090-1 which may be non-persistent memory for temporarily storing instructions 1095 or software executed by processing circuitry 1060. Each hardware device may comprise one or more network interface controllers (NICs) 1070, also known as network interface cards, which include physical network interface 1080. Each hardware device may also include non-transitory, persistent, machine-readable storage media 1090-2 having stored therein software 1095 and/or instructions executable by processing circuitry 1060. Software 1095 may include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and may be run by a corresponding virtualization layer 1050 or hypervisor. Different embodiments of the instance of virtual appliance 1020 may be implemented on one or more of virtual machines 1040, and the implementations may be made in different ways.

During operation, processing circuitry 1060 executes software 1095 to instantiate the hypervisor or virtualization layer 1050, which may sometimes be referred to as a virtual machine monitor (VMM). Virtualization layer 1050 may present a virtual operating platform that appears like networking hardware to virtual machine 1040.

As shown in FIG. 10, hardware 1030 may be a standalone network node with generic or specific components. Hardware 1030 may comprise antenna 10225 and may implement some functions via virtualization. Alternatively, hardware 1030 may be part of a larger cluster of hardware (e.g. such as in a data center or customer premise equipment (CPE)) where many hardware nodes work together and are managed via management and orchestration (MANO) 10100, which, among others, oversees lifecycle management of applications 1020.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1040 may be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 10.

In some embodiments, one or more radio units 10200 that each include one or more transmitters 10220 and one or more receivers 10210 may be coupled to one or more antennas 10225. Radio units 10200 may communicate directly with hardware nodes 1030 via one or more appropriate network interfaces and may be used in combination with the virtual components to provide a virtual node with radio capabilities, such as a radio access node or a base station.

In some embodiments, some signalling can be effected with the use of control system 10230 which may alternatively be used for communication between the hardware nodes 1030 and radio units 10200.

Figure 11:
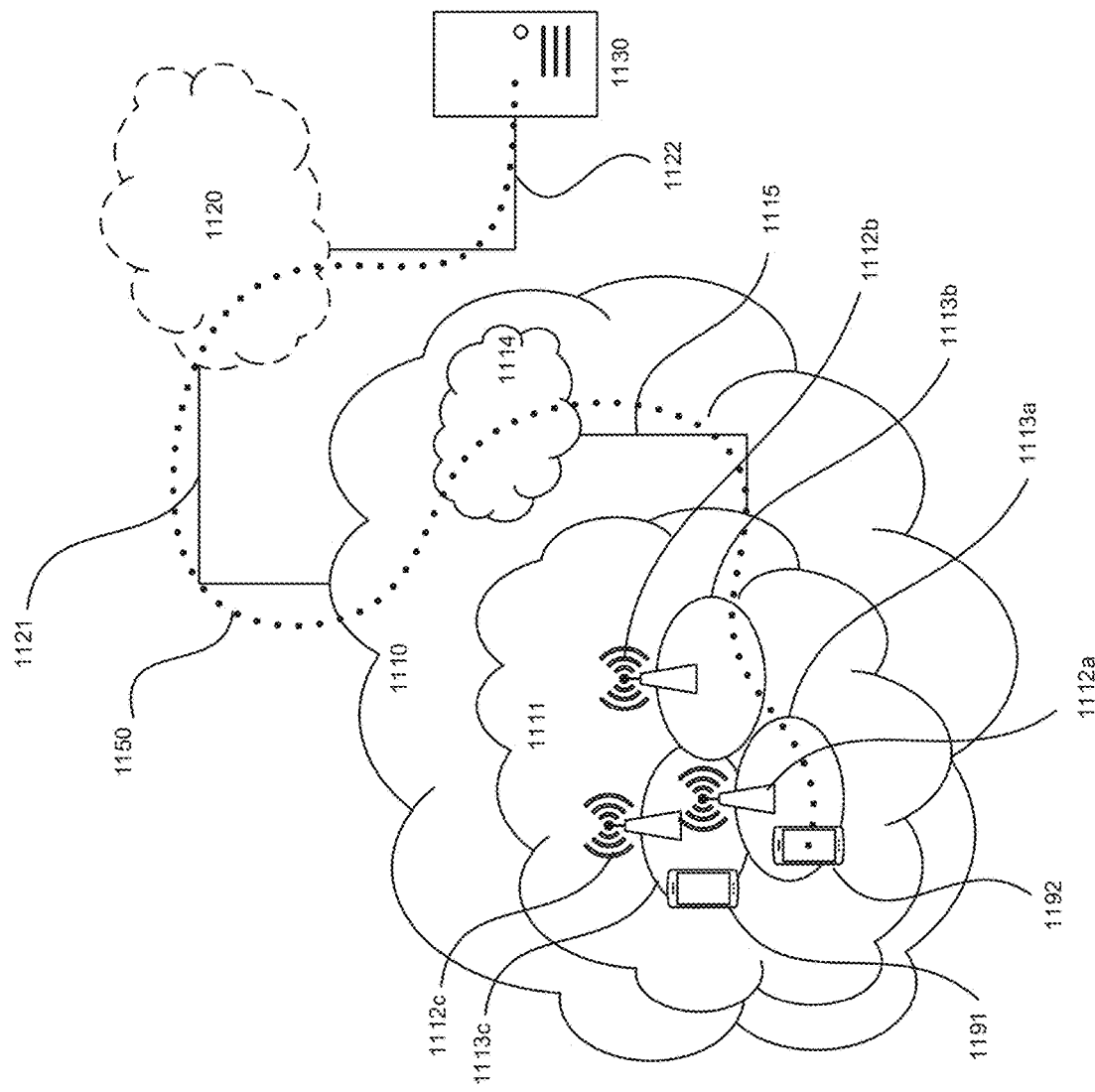
FIG. 11 shows an exemplary telecommunications network applicable to the solution presented herein.

With reference to FIG. 11, in accordance with an embodiment, a communication system includes telecommunication network 1110, such as a 3GPP-type cellular network, which comprises access network 1111, such as a radio access network, and core network 1114. Access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to core network 1114 over a wired or wireless connection 1115. A first UE 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider, or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Example implementations, in accordance with an embodiment, of the UE, base station and host computer discussed in the preceding paragraphs will now be described with reference to FIG. 12. In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which may have storage and/or processing capabilities. In particular, processing circuitry 1218 may comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 may be operable to provide a service to a remote user, such as UE 1230 connecting via OTT connection 1250 terminating at UE 1230 and host computer 1210. In providing the service to the remote user, host application 1212 may provide user data which is transmitted using OTT connection 1250.

Communication system 1200 further includes base station 1220 provided in a telecommunication system and comprising hardware 1225 enabling it to communicate with host computer 1210 and with UE 1230. Hardware 1225 may include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by base station 1220. Communication interface 1226 may be configured to facilitate connection 1260 to host computer 1210. Connection 1260 may be direct or it may pass through a core network (not shown in FIG. 12) of the telecommunication system and/or through one or more intermediate networks outside the telecommunication system. In the embodiment shown, hardware 1225 of base station 1220 further includes processing circuitry 1228, which may comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 further includes UE 1230 already referred to. Its hardware 1235 may include radio interface 1237 configured to set up and maintain wireless connection 1270 with a base station serving a coverage area in which UE 1230 is currently located. Hardware 1235 of UE 1230 further includes processing circuitry 1238, which may comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 may be operable to provide a service to a human or non-human user via UE 1230, with the support of host computer 1210. In host computer 1210, an executing host application 1212 may communicate with the executing client application 1232 via OTT connection 1250 terminating at UE 1230 and host computer 1210. In providing the service to the user, client application 1232 may receive request data from host application 1212 and provide user data in response to the request data. OTT connection 1250 may transfer both the request data and the user data. Client application 1232 may interact with the user to generate the user data that it provides.

Figure 12:
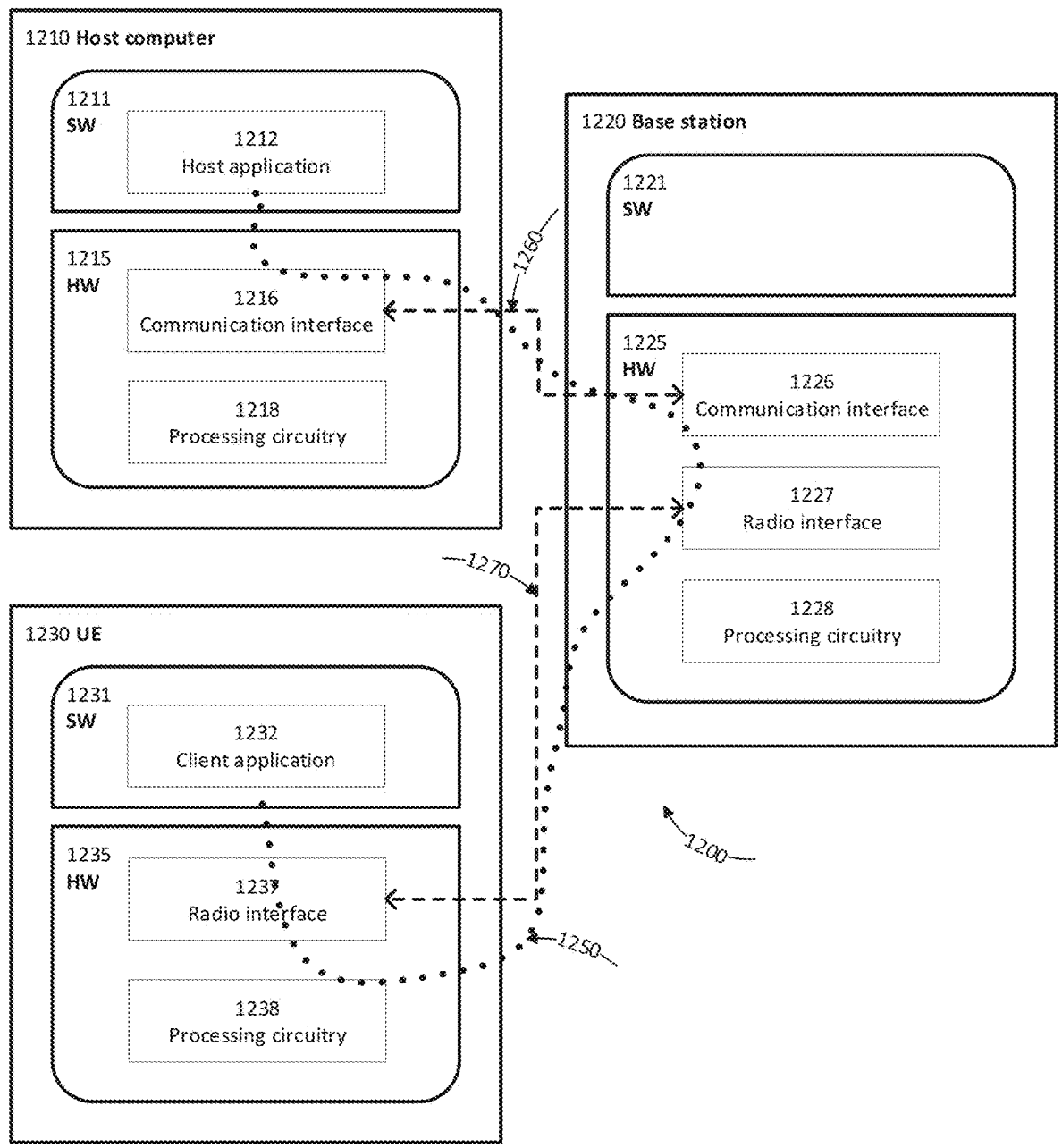
FIG. 12 shows an exemplary host computer applicable to the solution presented herein.

It is noted that host computer 1210, base station 1220 and UE 1230 illustrated in FIG. 12 may be similar or identical to host computer 1130, one of base stations 1112*a*, 1112*b*, 1112*c* and one of UEs 1191, 1192 of FIG. 11, respectively. This is to say, the inner workings of these entities may be as shown in FIG. 12 and independently, the surrounding network topology may be that of FIG. 11.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure may determine the routing, which it may be configured to hide from UE 1230 or from the service provider operating host computer 1210, or both. While OTT connection 1250 is active, the network infrastructure may further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment. More precisely, the teachings of these embodiments may improve the data rate, latency, and power consumption, and thereby provide benefits such as reduced user waiting time, better responsiveness, and extended battery time, among others.

A measurement procedure may be provided for the purpose of monitoring data rate, latency and other factors on which the one or more embodiments improve. There may further be an optional network functionality for reconfiguring OTT connection 1250 between host computer 1210 and UE 1230, in response to variations in the measurement results. The measurement procedure and/or the network functionality for reconfiguring OTT connection 1250 may be implemented in software 1211 and hardware 1215 of host computer 1210 or in software 1231 and hardware 1235 of UE 1230, or both. In embodiments, sensors (not shown) may be deployed in or in association with communication devices through which OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of OTT connection 1250 may include message format, retransmission settings, preferred routing etc.; the reconfiguring need not affect base station 1220, and it may be unknown or imperceptible to base station 1220. Such procedures and functionalities may be known and practiced in the art. In certain embodiments, measurements may involve proprietary UE signaling facilitating host computer 1210's measurements of throughput, propagation times, latency and the like. The measurements may be implemented in that software 1211 and 1231 causes messages to be transmitted, in particular empty or 'dummy' messages, using OTT connection 1250 while it monitors propagation times, errors etc.

Figure 13:
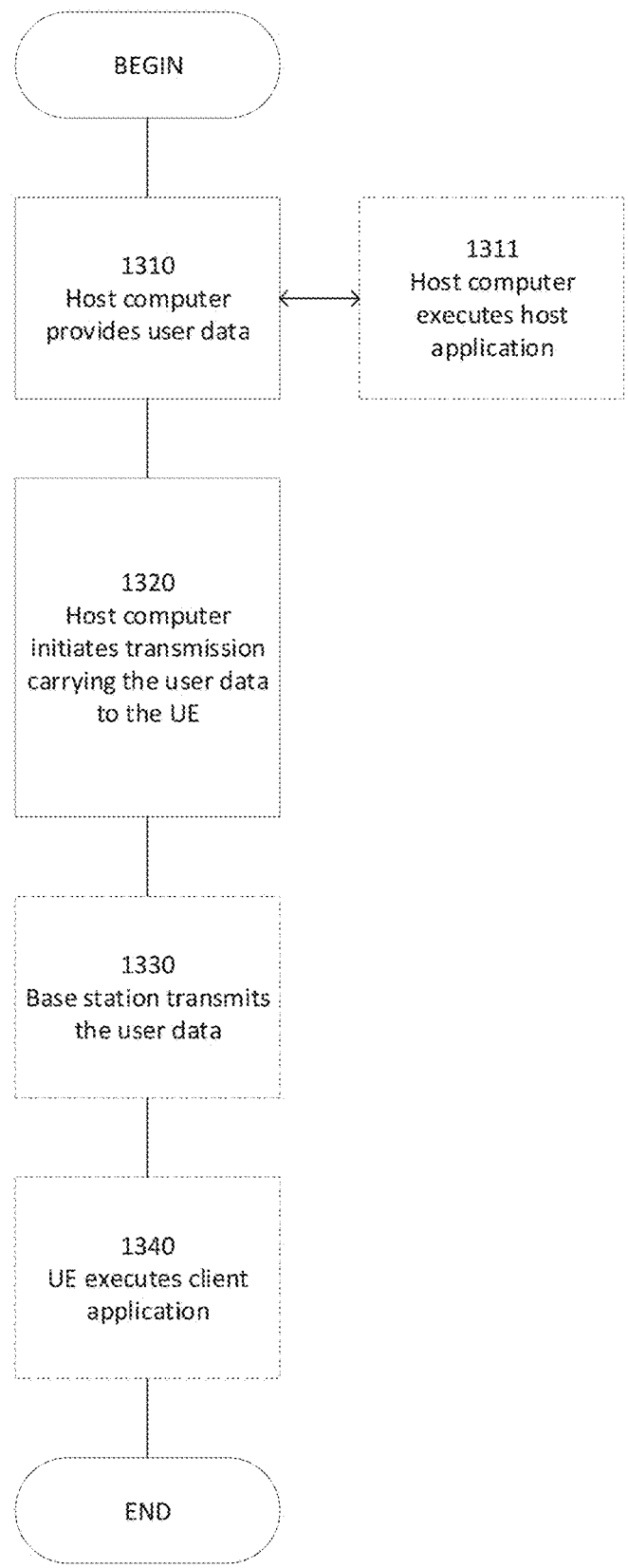
FIG. 13 shows an exemplary method implemented in a communication system in accordance with embodiments of the solution presented herein.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 1310, the host computer provides user data. In substep 1311 (which may be optional) of step 1310, the host computer provides the user data by executing a host application. In step 1320, the host computer initiates a transmission carrying the user data to the UE. In step 1330 (which may be optional), the base station transmits to the UE the user data which was carried in the transmission that the host computer initiated, in accordance with the teachings of the embodiments described throughout this disclosure. In step 1340 (which may also be optional), the UE executes a client application associated with the host application executed by the host computer.

Figure 14:
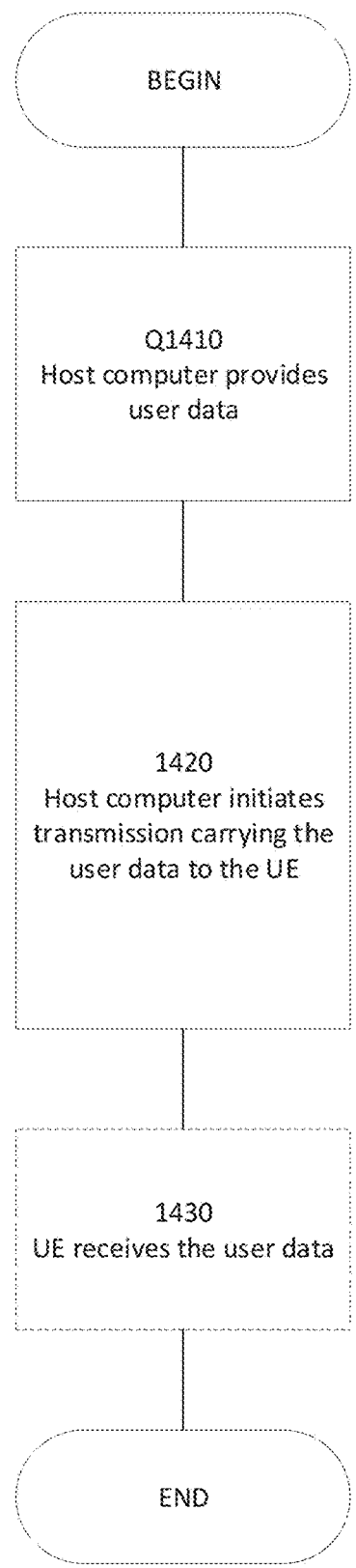
FIG. 14 shows another exemplary method implemented in a communication system in accordance with embodiments of the solution presented herein.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 1410 of the method, the host computer provides user data. In an optional substep (not shown) the host computer provides the user data by executing a host application. In step 1420, the host computer initiates a transmission carrying the user data to the UE. The transmission may pass via the base station, in accordance with the teachings of the embodiments described throughout this disclosure. In step 1430 (which may be optional), the UE receives the user data carried in the transmission.

Figure 15:
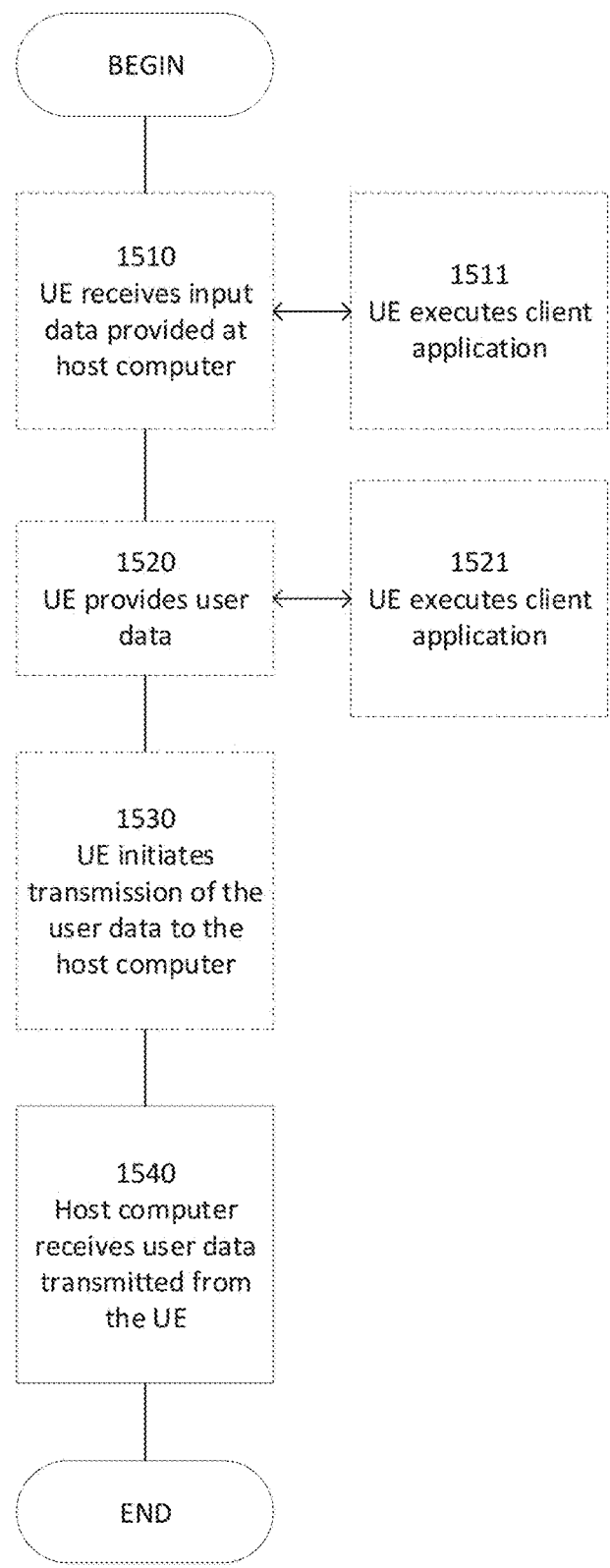
FIG. 15 shows another exemplary method implemented in a communication system in accordance with embodiments of the solution presented herein.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 1510 (which may be optional), the UE receives input data provided by the host computer. Additionally or alternatively, in step 1520, the UE provides user data. In substep 1521 (which may be optional) of step 1520, the UE provides the user data by executing a client application. In substep 1511 (which may be optional) of step 1510, the UE executes a client application which provides the user data in reaction to the received input data provided by the host computer. In providing the user data, the executed client application may further consider user input received from the user. Regardless of the specific manner in which the user data was provided, the UE initiates, in substep 1530 (which may be optional), transmission of the user data to the host computer. In step 1540 of the method, the host computer receives the user data transmitted from the UE, in accordance with the teachings of the embodiments described throughout this disclosure.

Figure 16:
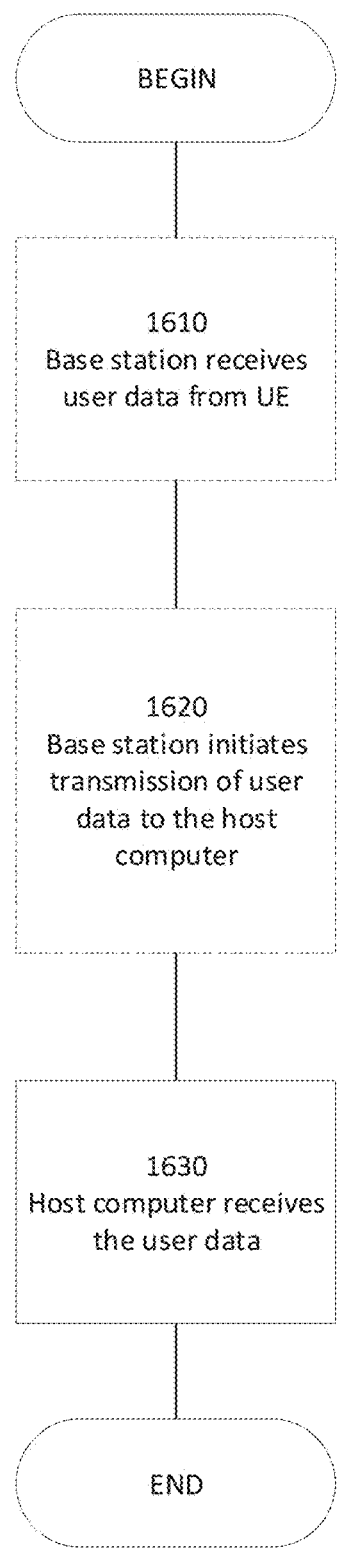
FIG. 16 shows another exemplary method implemented in a communication system in accordance with embodiments of the solution presented herein.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 1610 (which may be optional), in accordance with the teachings of the embodiments described throughout this disclosure, the base station receives user data from the UE. In step 1620 (which may be optional), the base station initiates transmission of the received user data to the host computer. In step 1630 (which may be optional), the host computer receives the user data carried in the transmission initiated by the base station.

Any appropriate steps, methods, features, functions, or benefits disclosed herein may be performed through one or more functional units, circuits, or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The solution presented herein may, of course, be carried out in other ways than those specifically set forth herein without departing from essential characteristics of the solution presented herein. The present embodiments are to be considered in all respects as illustrative and not restrictive, and all changes coming within the meaning and equivalency range of the appended claims are intended to be embraced therein.

The following, which was included with the corresponding Provisional Application, is the standards submissions associated with the solution presented herein.
3GPP TSG-RAN WG3 #97bis R3-173956
Prague, Czech Republic, 9-13 Oct. 2017
Agenda Item: 10.8.3.1
Source: Ericsson
Title: Enhancement on the Downlink Data Delivery Status
Document for: pCR
Introduction In the past meetings, different flow control enhancements have been submitted to RAN3.

We discuss in this paper the enhancement we may consider in Downlink Data Delivery Status.

Discussion

In the Downlink Data Delivery Status (DDDS) message, there below three information elements are mandatory presented:

the highest PDCP PDU sequence number successfully delivered in sequence to the UE among those PDCP PDUs received from the gNB hosting the PDCP entity;
the desired buffer size in bytes for the concerned data bearer;
the minimum desired buffer size in bytes for the UE;

This implies that firstly the DDDS is meant for the RLC AM mode and secondly the Downlink Data Delivery Status sending frequency is determined by the RLC Acked rate.

We see the need to send the first DDDS early than the first RLC Acked to indicate to the node hosting the PDCP entity the desired buffer size, and also the case to using DDDS to only provide the information on the desired buffer size and the minimum desired buffer size with the absence of the highest PDCP PDU sequence number successfully delivered. Thus we need to introduce a way in DDDS to make the highest PDCP PDU sequence number successfully delivered an optional information element.

Proposal 1: RAN3 to Agree to Make the Highest PDCP PDU Sequence Number Successfully Delivered Optional.

DDDS could be useful both for RLC AM and RLC UM. For UM flow control, it is sufficient to get updates on what had been transmitted to the lower layer (e.g. MAC layer).

Highest transmitted PDCP Sequence Number is meant to be the highest PDCP SN that has been requested by MAC for transmission over the Uu interface. To introduce this in to DDDS, we may get more frequent DDDS report than the RLC Acked rate, so the node hosting PDCP entity could have more up to date status information. Further it also provides information for the node hosting PDCP entity the transmission status of the PDCP PDUs to the lower layer, however it can not be used to remove the PDCP PDU in RLC AM mode.

Proposal 2: RAN3 to Agree to Include the Highest Transmitted PDCP Sequence Number in DDDS.

To use the DDDS for RLC UM mode, we need to modify the definition for the two mandatory IEs, desired buffer size and minimum desired buffer size, so when apply to RLC UM mode, they refer to the user data transmitted to MAC layer.

Proposal 3: RAN3 to Agree to Modify Desired Buffer Size and Minimum Desired Buffer Size to Cover RLC UM Mode.

The highest transmitted PDCP Sequence Number to MAC layer is meant to be used both for RLC UM and RLC AM. To ensure that we could use DDDS without always needing to include the highest transmitted PDCP Sequence Number, in the case that we wish to send DDDS before any data transmission, and in the case that we only wish to update the desired buffer size and in the case that there is no change to the highest transmitted PDCP Sequence Number so we do not need to repeat the same information, we propose to also make this information element optional.

Proposal 4: RAN3 to Agree to Make the Highest Transmitted PDCP Sequence Number Optional.

There are only 2 spare bits left in the DDDS frame format. In our opinion, it is beneficial to add more spare bits. Thus we may consider to include 1 octet spare bits for future extension.

Proposal 5: RAN3 to Consider to Add One Octet Spare Bits in DDDS Frame.

Conclusions and Proposals

Proposal 1: RAN3 to agree to make the highest PDCP PDU sequence number successfully delivered optional.

Proposal 2: RAN3 to agree to include the highest transmitted PDCP Sequence Number in DDDS.

Proposal 3: RAN3 to agree to modify desired buffer size and minimum desired buffer size to cover RLC UM mode.

Proposal 4: RAN3 to agree to make the highest transmitted PDCP Sequence Number optional.

Proposal 5: RAN3 to consider to add one octet spare bits in DDDS frame.

Text Proposal to TS 38.425 v 0.1.0

5.2 Xn user plane protocol layer services

Editor's Note: All the text below is For Further Study (FFS).

The following functions are provided by the Xn UP protocol for dual connectivity:

- Provision of Xn UP specific sequence number information for user data transferred from the MgNB to the SgNB for a specific data bearer configured with the split bearer option;
- Information of successful in sequence delivery of PDCP PDUs to the UE from SgNB for user data associated with a specific data bearer configured with the split bearer option;
- Information of successful in sequence transmitted PDCP PDUs to the MAC layer from S-NG-RAN node for user data associated with a specific data bearer configured with the split bearer option;
- Information of PDCP PDUs that were not delivered to the UE;
- Information of the currently desired buffer size at the SgNB for transmitting to the UE user data or MAC layer associated with a specific data bearer configured with the split bearer option;
- Information of the currently minimum desired buffer size at the SgNB for transmitting to the UE user data or MAC layer associated with all data bearers configured with the split bearer option.

The following functions are provided by the Xn UP protocol for the SCG split bearer for dual connectivity with NR in E-UTRAN:

- Provision of Xn UP specific sequence number information for user data transferred from the SgNB to the MgNB for a specific data bearer configured with the SCG split bearer option;
- Information of successful in sequence delivery of PDCP PDUs to the UE from MgNB for user data associated with a specific data bearer configured with the SCG split bearer option;
- Information of successful in sequence transmitted PDCP PDUs to the MAC layer from M-NG-RAN node for user data associated with a specific data bearer configured with the SCG split bearer option;
- Information of PDCP PDUs from the MgNB that were not delivered to the UE;
- Information of the currently desired buffer size at the MgNB for transmitting to the UE user data or MAC layer associated with a specific data bearer configured with the split bearer option;
- Information of the currently minimum desired buffer size at the MgNB for transmitting to the UE user data or MAC layer associated with all data bearers configured with the split bearer option.

---

Skip unchanged text

---

5.4.2 Downlink Data Delivery Status

Editor's Note: All the text below is FFS [for further study].

The purpose of the Downlink Data Delivery Status procedure is to provide feedback from the corresponding gNB to the gNB hosting the PDCP entity to allow the gNB hosting the PDCP entity to control the downlink user data flow via the corresponding gNB for the respective data bearer. The corresponding gNB may also transfer uplink user data for the concerned data bearer to the gNB hosting the PDCP entity together with a DL DATA DELIVERY STATUS frame within the same GTP-U PDU.

The Downlink Data Delivery Status procedure is also used to provide feedback from the corresponding gNB to the gNB hosting the PDCP entity to allow the gNB hosting the PDCP entity to control the successful delivery of DL control data to the corresponding gNB. In this case the corresponding gNB is always the SgNB and the gNB hosting the PDCP entity is always the MgNB [FFS whether this sentence needs rewording].

When the corresponding gNB decides to trigger the Feedback for Downlink Data Delivery procedure it shall report:

a) the highest PDCP PDU sequence number successfully delivered in sequence to the UE among those PDCP PDUs received from the gNB hosting the PDCP entity; it is used for RLC AM only.

b) the desired buffer size in bytes for the concerned data bearer;

c) the minimum desired buffer size in bytes for the UE or MAC layer;

d) the Xn-U packets that were declared as being "lost" by the corresponding gNB and have not yet been reported to the gNB hosting the PDCP entity within the DL DATA DELIVERY STATUS frame.

e) the highest transmitted PDCP Sequence Number in sequence to the MAC layer among those PDCP PDUs received from the NG-RAN node hosting the PDCP entity;

NOTE: If an E-UTRAN deployment has decided not to use the Transfer of Downlink User Data procedure, d) above is not applicable.

The DL DATA DELIVERY STATUS frame shall also include an indication whether the frame is the last DL status report received in the course of releasing a bearer from the corresponding gNB. When receiving such indication, if applicable, the gNB hosting the PDCP entity considers that no more UL data is to be expected from the corresponding gNB.

The gNB hosting the PDCP entity, when receiving the DL DATA DELIVERY STATUS frame:

- regards the desired buffer size under b) and c) above as the amount of data desired from the corresponding gNB being declared
- from the PDCP sequence number reported under a) above within the same frame, as well as from the most recently reported PDCP sequence number(s) of all other data bearers established for the UE;

as the momentary desired buffer sizes, independent of buffer sizes indicated in the past.

is allowed to remove the buffered PDCP PDUs according to the feedback of successfully delivered PDCP PDUs;

decides upon the actions necessary to take for PDCP PDUs reported other than successfully delivered.

After being reported to the gNB hosting the PDCP entity, the corresponding gNB removes the respective PDCP sequence numbers.

---

Skip unchanged text

---

Editor's Note: All the text below is FFS.

This frame format is defined to transfer feedback to allow the receiving gNB (i.e. gNB that hosts the PDCP entity) to control the downlink user data flow via the sending gNB (i.e. gNB that does not host the PDCP entity).

| | Bits | | | | | | | Number of Octets |
|---|---|---|---|---|---|---|---|---|
| 7 | 6 | 5 | 4 | 3 | 2 | 1 | 0 | |
| PDU Type (=1) | | | | Highest PDCP Transmitted Ind | Highest PDCP Delivered Ind | Final Frame Ind. | Lost Packet Report | 1 |
| Spare | | | | | | | | 1 |
| Highest successfully delivered PDCP Sequence Number | | | | | | | | 3 |
| Desired buffer size for the data bearer | | | | | | | | 4 |
| Minimum desired buffer size for the UE | | | | | | | | 4 |
| Number of lost Xn-U Sequence Number ranges reported | | | | | | | | 1 |
| Start of lost Xn-U Sequence Number range | | | | | | | | 6* (Number of reported lost Xn-U SN ranges) |
| End of lost Xn-U Sequence Number range | | | | | | | | |
| Highest transmitted PDCP Sequence Number | | | | | | | | 3 |
| Spare extension | | | | | | | | 1-7 |

Figure z.5.2.2-1: DL DATA DELIVERY STATUS (PDU Type 1) Format

Editor's Note: All the text below is FFS.

Description: This parameter indicates the end of an Xn-U sequence number range.

Value range: $\{0 \ldots 2^{24}-1\}$.

Field length: 3 octets.

Editor's Note: All the text below is FFS.

Description: This parameter indicates feedback about the in-sequence transmitted status of PDCP PDUs at the corresponding NG-RAN node towards the MAC layer.

Value range: $\{0 \ldots 2^{18}-1\}$.

Field length: 3 octets.

Editor's Note: All the text below is FFS.

Description: This parameter indicates the presence of the Highest successfully delivered PDCP Sequence Number.

Value range: {0=Highest successfully delivered PDCP Sequence Number not present, 1=Highest successfully delivered PDCP Sequence Number present}.

Field length: 1 bit.

Editor's Note: All the text below is FFS.

Description: This parameter indicates the presence of the Highest transmitted PDCP Sequence Number.

Value range: {0=Highest transmitted PDCP Sequence Number not present, 1=Highest transmitted PDCP Sequence Number present}.

Field length: 1 bit.

Editor's Note: All the text below is FFS.

Description: The spare extension field shall not be sent. The receiver should be capable of receiving a spare extension. The spare extension should not be interpreted by the receiver, since in later versions of the present document additional new fields might be added in place of the spare extension. The spare extension can be an integer number of octets carrying new fields or additional information; the maximum length of the spare extension field (m) depends on the PDU type.

Value range: $0-2^{m*8}-1$.

Field Length: 0-m octets. For the PDU Types defined in the present document m=4.

ABBREVIATIONS

At least some of the following abbreviations may be used herein. If there is an inconsistency between abbreviations, preference should be given to how it is used above. If listed multiple times below, the first listing should be preferred over any subsequent listing(s).

1xRTT CDMA2000 1xRadio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
CU Central Unit
DCCH Dedicated Control Channel
DC Dual Connectivity
DDDS Downlink Data Delivery Status
DL Downlink
DM Demodulation
DMRS Demodulation Reference Signal
DRX Discontinuous Reception
DTX Discontinuous Transmission
DTCH Dedicated Traffic Channel
DU Distributed Unit
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR (corresponding to eNB in LTE)
GNSS Global Navigation Satellite System
GSM Global System for Mobile communication HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio (5G)
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
UP User Plane
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network
XnUP Xn interface user plane protocol

What is claimed is:

1. A method of reporting a Downlink Data Delivery Status (DDDS) for a wireless terminal from a first network node to a second network node, the method implemented by the first network node and comprising:
generating a DDDS frame comprising:
at least a first Information Element (IE) specifying a desired buffer size for a data bearer and/or a minimum desired buffer size for the wireless terminal;
a first status indicator; and
a second status indicator;
determining whether to include a second IE in the DDDS frame, wherein the second IE specifies a highest sequence number for a packet successfully delivered to the wireless terminal;
setting a value of the first status indicator responsive to the determining whether to include the second IE in the DDDS frame to indicate a presence and/or an absence of the second IE in the DDDS frame;
adding the second IE to the DDDS frame when the first status indicator indicates the presence of the second IE in the DDDS frame;
determining whether to include a third IE in the DDDS frame, wherein the third IE specifies a highest sequence number for a packet sent to the wireless terminal;
setting a value of the second status indicator responsive to the determining whether to include the third IE to indicate a presence and/or absence of the third IE in the DDDS frame;
adding the third IE to the DDDS frame when the second status indicator indicates the presence of the third IE in the DDDS frame; and
sending the DDDS frame to the second network node to facilitate control, by the second network node, of downlink data flow to the wireless terminal.

2. The method of claim 1, wherein determining whether to include the second IE comprises determining to exclude the second IE from the DDDS frame when the wireless terminal has not yet received data packets.

3. The method of claim 1, wherein determining whether to include the second IE comprises determining to exclude the second IE from the DDDS frame when the first network node has not yet received data packets from the second network node.

4. The method of claim 1, wherein determining whether to include the second IE comprises determining to exclude the second IE from the DDDS frame responsive to determining that a current highest sequence number for a packet successfully delivered to the wireless terminal is the same as the highest sequence number specified in a previously sent DDDS frame.

5. The method of claim 1, wherein the first status indicator further indicates the second IE in the DDDS frame comprises a dummy IE.

6. The method of claim 1, wherein setting the value of the first status indicator comprises:
setting the value of the first status indicator to "0" to indicate the presence of the second IE in the DDDS frame; and
setting the value of the first status indicator to "1" to indicate the absence of the second IE from the DDDS frame.

7. The method of claim 1, wherein the second IE specifies a highest Packet Data Convergence Protocol (PDCP) Packet Data Unit (PDU) sequence number successfully delivered to the wireless terminal.

8. The method of claim 1, wherein the third IE specifies a highest Packet Data Convergence Protocol (PDCP) Packet Data Unit (PDU) sequence number sent to the wireless terminal.

9. The method of claim 1, further comprising:
receiving downlink data packets from the second network node via a network interface responsive to the sent DDDS frame; and
wirelessly transmitting the received downlink data packets to the wireless terminal.

10. A non-transitory computer-readable medium having stored thereon machine-readable instructions executable to cause a machine to perform operations comprising:
generating a DDDS frame comprising:
at least a first Information Element (IE) specifying a desired buffer size for a data bearer and/or a minimum desired buffer size for a wireless terminal;
a first status indicator; and
a second status indicator;
determining whether to include a second IE in the DDDS frame, wherein the second IE specifies a highest sequence number for a packet successfully delivered to the wireless terminal;
setting a value of the first status indicator responsive to the determining whether to include the second IE in the DDDS frame to indicate a presence and/or an absence of the second IE in the DDDS frame;
adding the second IE to the DDDS frame when the first status indicator indicates the presence of the second IE in the DDDS frame;
determining whether to include a third IE in the DDDS frame, wherein the third IE specifies a highest sequence number for a packet sent to the wireless terminal;
setting a value of the second status indicator responsive to the determining whether to include the third IE to indicate a presence and/or absence of the third IE in the DDDS frame;
adding the third IE to the DDDS frame when the second status indicator indicates the presence of the third IE in the DDDS frame; and
sending the DDDS frame to a network node to facilitate control, by the network node, of downlink data flow to the wireless terminal.

11. A first network node configured to report a Downlink Data Delivery Status (DDDS) for a wireless terminal to a second network node, the first network node comprising:
one or more processing circuits configured to:
generate a DDDS frame comprising:
at least a first Information Element (IE) specifying a desired buffer size for a data bearer and/or a minimum desired buffer size for the wireless terminal;
a first status indicator; and
a second status indicator;
determine whether to include a second IE in the DDDS frame, wherein the second IE specifies a highest sequence number for a packet successfully delivered to the wireless terminal;
set a value of the first status indicator responsive to the determining to indicate a presence and/or an absence of the second IE in the DDDS frame;
add the second IE to the DDDS frame when the first status indicator indicates the presence of the second IE in the DDDS frame;
determine whether to include a third IE in the DDDS frame, wherein the third IE specifies a highest sequence number for a packet sent to the wireless terminal;
set a value of the second status indicator responsive to the determining whether to include the third IE to indicate a presence and/or absence of the third IE in the DDDS frame;
add the third IE to the DDDS frame when the second status indicator indicates the presence of the third IE in the DDDS frame; and
a communication circuit configured to send the DDDS frame to the second network node to facilitate control, by the second network node, of downlink data flow to the wireless terminal.

12. The first network node of claim 11, wherein the one or more processing circuits determine whether to include the second IE by determining to exclude the second IE from the DDDS frame when the wireless terminal has not yet received data packets.

13. The first network node of claim 11, wherein the one or more processing circuits determine whether to include the second IE by determining to exclude the second IE from the DDDS frame when the first network node has not yet received data packets from the second network node.

14. The first network node of claim 11, wherein the one or more processing circuits determine whether to include the second IE by determining to exclude the second IE from the DDDS frame responsive to determining that a current highest sequence number for a packet successfully delivered to the wireless terminal is the same as the highest sequence number specified in a previously sent DDDS frame.

15. The first network node of claim 11, wherein the first status indicator further indicates the second IE in the DDDS frame comprises a dummy IE.

16. The first network node of claim 11, wherein the one or more processing circuits set the value of the first status indicator by:
setting the value of the first status indicator to "0" to indicate the presence of the second IE in the DDDS frame; and
setting the value of the first status indicator to "1" to indicate the absence of the second IE from the DDDS frame.

17. The first network node of claim 11, wherein the second IE specifies a highest Packet Data Convergence Protocol (PDCP) Packet Data Unit (PDU) sequence number successfully delivered to the wireless terminal.

18. The first network node of claim 11, wherein the third IE specifies a highest Packet Data Convergence Protocol (PDCP) Packet Data Unit (PDU) sequence number sent to the wireless terminal.

\* \* \* \* \*